US012670575B2

(12) United States Patent
Ruan et al.

(10) Patent No.: US 12,670,575 B2
(45) Date of Patent: Jun. 30, 2026

(54) PATTERNING PARAMETER DETERMINATION USING A CHARGED PARTICLE INSPECTION SYSTEM

(71) Applicant: ASML Netherlands B.V., Veldhoven (NL)

(72) Inventors: Junru Ruan, Beaverton, OR (US); Haiyan Li, Hillsboro, OR (US)

(73) Assignee: ASML Netherlands B.V., Veldoven (NL)

( * ) Notice: Subject to any disclaimer, the term of this patent is extended or adjusted under 35 U.S.C. 154(b) by 224 days.

(21) Appl. No.: 18/596,323

(22) Filed: Mar. 5, 2024

(65) Prior Publication Data

US 2024/0212125 A1     Jun. 27, 2024

Related U.S. Application Data

(63) Continuation of application No. PCT/EP2022/072341, filed on Aug. 9, 2022.

(60) Provisional application No. 63/241,632, filed on Sep. 8, 2021.

(51) Int. Cl.
*G06T 7/00*          (2017.01)
*G06T 7/60*          (2017.01)

(52) U.S. Cl.
CPC .............. *G06T 7/0004* (2013.01); *G06T 7/60* (2013.01); *G06T 2207/10061* (2013.01); *G06T 2207/30144* (2013.01); *G06T 2207/30148* (2013.01)

(58) Field of Classification Search
CPC ..................... G06T 7/0004; G06T 7/60; G06T 2207/10061; G06T 2207/30144; G06T 2207/30148; G03F 7/705; G03F 7/70625; G03F 7/70641; G03F 7/70616
See application file for complete search history.

(56) References Cited

U.S. PATENT DOCUMENTS

| | | | | |
|---|---|---|---|---|
| 5,229,872 A | 7/1993 | Mumola | | |
| 9,188,974 B1 | 11/2015 | Mack et al. | | |
| 11,815,820 B2 * | 11/2023 | Moon | ...................... | G06N 3/08 |
| 12,332,573 B2 * | 6/2025 | Kooiman | ............ | G03F 7/70625 |

(Continued)

FOREIGN PATENT DOCUMENTS

| | | |
|---|---|---|
| TW | 202113500 A | 4/2021 |
| WO | WO 2020/233950 A1 | 11/2020 |
| WO | WO 2021/083608 A1 | 5/2021 |

OTHER PUBLICATIONS

International Search Report issued in related International Application No. PCT/EP2022/072341, mailed Dec. 13, 2022 (2 pgs.).

*Primary Examiner* — Xuemei G Chen

(74) *Attorney, Agent, or Firm* — FINNEGAN, HENDERSON, FARABOW, GARRETT & DUNNER LLP

(57) ABSTRACT

A method of obtaining focus and dose data that requires no special marks and that uses images of in-die features is described. A focus/dose matrix wafer is created. Dimensions such as critical dimension (CD), CD uniformity (CDU), edge placement error (EPE), etc., at in-die locations are measured using a charged particle inspection system having a large field of view. Machine learning or regression methods are used to determine a relationship between focus and dose and the measured data. The same dimensions can then be measured on a production wafer and the relationship can be utilized to determine the focus and dose for the production wafer.

20 Claims, 14 Drawing Sheets

(56)         References Cited

U.S. PATENT DOCUMENTS

| | | | |
|---|---|---|---|
| 12,443,111 B2 * | 10/2025 | Wang | G03F 1/36 |
| 2005/0037271 A1 | 2/2005 | Shishido et al. | |
| 2005/0099628 A1 * | 5/2005 | Kokumai | G03F 9/7046 |
| | | | 356/401 |
| 2005/0221207 A1 | 10/2005 | Nagatomo et al. | |
| 2007/0031745 A1 * | 2/2007 | Ye | G03F 7/705 |
| | | | 430/30 |
| 2011/0107277 A1 * | 5/2011 | Tsujita | G03F 7/70125 |
| | | | 716/50 |
| 2011/0295555 A1 | 12/2011 | Meessen et al. | |
| 2012/0013875 A1 * | 1/2012 | Geraets | G01N 21/956 |
| | | | 355/55 |
| 2014/0257761 A1 | 9/2014 | Zhou et al. | |
| 2017/0160648 A1 * | 6/2017 | Tel | G03F 7/70516 |
| 2018/0089359 A1 * | 3/2018 | Chen | G03F 7/70641 |
| 2019/0339621 A1 * | 11/2019 | Verschuren | G03F 1/50 |
| 2019/0378012 A1 | 12/2019 | Tripodi et al. | |
| 2021/0018850 A1 * | 1/2021 | Slachter | G03F 7/70558 |
| 2021/0241449 A1 * | 8/2021 | Wang | G06T 7/0004 |
| 2022/0035256 A1 * | 2/2022 | Zhang | G03F 7/7085 |
| 2022/0043356 A1 * | 2/2022 | Zhang | G03F 7/705 |
| 2022/0091517 A1 * | 3/2022 | Staals | G03F 7/70641 |
| 2025/0053702 A1 * | 2/2025 | Hunsche | G03F 7/705 |

* cited by examiner

630

632

634

636

638

640

PATTERNING PARAMETER DETERMINATION USING A CHARGED PARTICLE INSPECTION SYSTEM

CROSS-REFERENCE TO RELATED APPLICATIONS

This application claims priority of International application PCT/EP2022/072341, filed on 9 Aug. 2022, which claims priority of U.S. application 63/241,632, filed on 8 Sep. 2021. These applications are incorporated herein by reference in their entireties.

TECHNICAL FIELD

The present disclosure relates generally to patterning parameter determination using a charged particle inspection associated with semiconductor manufacturing processes.

BACKGROUND

In manufacturing processes of integrated circuits (ICs), unfinished or finished circuit components are inspected to ensure that they are manufactured according to design and are free of defects. Inspection systems utilizing optical microscopes or charged particle (e.g., electron) beam microscopes, such as a scanning electron microscope (SEM) can be employed. As the physical sizes of IC components continue to shrink, and their structures continue to become more complex, accuracy and throughput in defect detection and inspection become more important. The overall image quality depends on a combination of high secondary-electron and backscattered-electron signal detection efficiencies, among others. Backscattered electrons have higher emission energy to escape from deeper layers of a sample, and therefore, their detection may be desirable for imaging of complex structures such as buried layers, nodes, high-aspect-ratio trenches, or holes of 3D NAND devices. For applications such as overlay metrology, it may be desirable to obtain high quality imaging and efficient collection of surface information from secondary electrons and buried layer information from backscattered electrons.

SUMMARY

Focus, dose, or other patterning parameters are often measured using Diffraction Based Focus (DBF) or Astigmatism Based Focus (ABF) techniques. These techniques require specially printed marks on a substrate, which use up patternable area on a substrate, need special optical proximity correction (OPC) considerations, and do not provide in-device information. Further, DBF is not suitable for extreme ultra violet (EUV) patterning applications.

According to some embodiments, there is provided a method for determining one or more patterning parameters used by a patterning system, using a charged particle inspection system. The method comprises inspecting a patterned substrate with the charged particle inspection system to determine one or more dimensions of the patterned substrate. The patterned substrate is produced using the patterning system and the one or more patterning parameters. The method comprises determining the one or more patterning parameters based on a relationship between the one or more patterning parameters and one or more determined dimensions of the patterned substrate. The relationship is determined based on training dimensions from a training substrate patterned with one or more training parameters varied across a patterning process window and inspected using the charged particle inspection system. The charged particle inspection system has a field of view configured to include a minimum threshold number of pattern types on the training substrate in the field of view. The training dimensions are determined based on the minimum threshold number of pattern types in the field of view.

In some embodiments, the one or more patterning parameters comprise focus and dose.

In some embodiments, the one or more patterning parameters and the patterning system are associated with an extreme ultra violet (EUV) patterning process.

In some embodiments, the one or more determined dimensions comprise critical dimension (CD), critical dimension uniformity (CDU), edge placement error (EPE), or local placement error (LPE).

In some embodiments, the field of view is at least two micrometers wide.

In some embodiments, a pattern type comprises one of more features of the patterned substrate that respond differently to variation of the training parameters across the patterning process window.

In some embodiments, the minimum threshold number of pattern types comprises three pattern types.

In some embodiments, the method further comprises determining an offset between a determined patterning parameter and a corresponding set point of the patterning system. In some embodiments, the method further comprises adjusting the patterning system based on the offset.

In some embodiments, the relationship is determined using multivariable regression.

In some embodiments, the multivariable regression comprises linear regression, polynomial regression, or machine learning based non-linear regression.

In some embodiments, the relationship is determined by a machine learning based prediction model trained using the training dimensions and the training parameters.

In some embodiments, the patterning system is a scanner used in a semiconductor lithography process.

In some embodiments, the process window comprises variations of the one or more patterning parameters associated with a regular production patterning process.

In some embodiments, the charged particle inspection system is a scanning electron microscope (SEM), and the patterned substrate is a patterned semiconductor wafer.

According to some embodiments, there is provided a method for determining one or more patterning parameters used by a patterning system, using a charged particle inspection system. The method comprises patterning, using the patterning system, a training substrate with one or more training parameters varied across a process window. The method comprises determining, using the charged particle inspection system, training dimensions from the training substrate. The method comprises determining a relationship between the training parameters and the training dimensions. The relationship is determined (1) using multivariable regression or (2) by a machine learning based prediction model trained using the training dimensions and the training parameters. The method comprises inspecting a patterned substrate with the charged particle inspection system to determine one or more dimensions of the patterned substrate. The patterned substrate is produced using the patterning system and the one or more patterning parameters. The method comprises determining the one or more patterning parameters based on the relationship and one or more determined dimensions of the patterned substrate.

According to some embodiments, there is provided a method for determining one or more semiconductor lithography parameters used by a scanner, using a scanning electron microscope (SEM). The method comprises inspecting a patterned semiconductor wafer with the SEM to determine one or more dimensions of the patterned semiconductor wafer. The patterned semiconductor wafer is produced using the scanner and the one or more semiconductor lithography parameters. The method comprises determining the one or more semiconductor lithography parameters based on a relationship between the one or more semiconductor lithography parameters and one or more determined dimensions of the patterned semiconductor wafer. The relationship is determined based on training dimensions from a training wafer patterned with one or more training parameters varied across a process window and inspected using the SEM. The SEM has a field of view configured to include a minimum threshold number of pattern types on the training wafer in the field of view. The training dimensions are determined based on the minimum threshold number of pattern types in the field of view. The method comprises determining an offset between a determined semiconductor lithography parameter and a corresponding set point of the scanner; and adjusting the scanner based on the offset.

According to some embodiments, there is provided a method for determining one or more patterning parameters used by a patterning system, using a charged particle inspection system. The method comprises determining a relationship between training parameters and training dimensions. A training substrate is patterned with one or more training parameters varied across a process window. Training dimensions are determined from the training substrate, using the charged particle inspection system. The relationship is determined (1) using multivariable regression or (2) by a machine learning based prediction model trained using the training dimensions and the training parameters. The method comprises inspecting a production substrate with the charged particle inspection system to determine one or more dimensions of the production substrate. The production substrate is produced using the patterning system and the one or more patterning parameters. The method comprises applying the relationship to determine the one or more patterning parameters based on the one or more determined dimensions of the patterned substrate.

According to other embodiments, corresponding systems, or computer readable media storing machine readable instructions, configured to perform (or cause one or more processors to perform) one or more of the operations described above, are provided.

Other advantages of the embodiments of the present disclosure will become apparent from the following description taken in conjunction with the accompanying drawings, which set forth, by way of illustration and example, certain example embodiments.

BRIEF DESCRIPTION OF THE DRAWINGS

The accompanying drawings, which are incorporated in and constitute a part of the specification, illustrate one or more embodiments and, together with the description, explain these embodiments. Embodiments will now be described, by way of example only, with reference to the accompanying schematic drawings in which corresponding reference symbols indicate corresponding parts, and in which.

DETAILED DESCRIPTION

Figure 1:
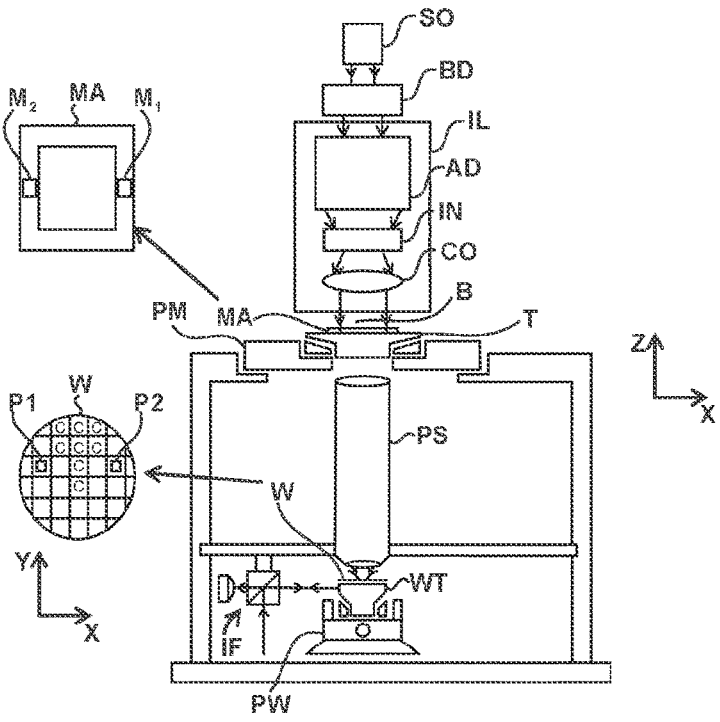
FIG. 1 is a schematic diagram of a lithographic projection apparatus, consistent with embodiments of the present disclosure.

Electronic devices are constructed of circuits formed on a piece of silicon called a substrate or a wafer. Many circuits may be formed as a repeating pattern of features together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than $\frac{1}{1000}$th the size of a human hair.

Making these extremely small ICs is a complex, time-consuming, and expensive process, often involving hundreds of individual steps. Errors in even one step have the potential to result in defects in the finished IC, thereby rendering it useless. Thus, one goal of the manufacturing process is to avoid such defects to maximize the number of functional ICs made in the process, that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection can be carried out using light based systems, or a scanning electron microscope (SEM) (as an example of a charged particle inspection system). Inspection systems can be used to image these extremely small structures, in effect, taking a "picture" of the structures. The image can be used to determine if the structure was formed properly and also if it was formed in the proper location. If the structure is defective, then the process can be adjusted so the defect is less likely to recur.

However, to obtain information about the manufacturing process, light based systems require specially printed marks on a wafer, which use up wafer area (that might otherwise be used for additional ICs), need special optical light correction considerations, and do not provide information about actual features of ICs (instead providing information about the specially printed marks used as substitutes for the actual features).

In contrast, some of the systems and methods described here utilize an SEM (for example) to determine information about the manufacturing process directly from actual features of ICs, without the need for specially printed marks, or special optical correction considerations. In some embodiments, this is accomplished by using the SEM to inspect and determine dimensions from a relatively large area of a wafer at the same time, and using multivariable regression or machine learning to predict the information about the manufacturing process based on the determined dimensions.

Embodiments of the present disclosure are described in detail with reference to the drawings, which are provided as illustrative examples of the disclosure so as to enable those skilled in the art to practice the disclosure. The figures and examples below are not meant to limit the scope of the present disclosure to a single embodiment, but other embodiments are possible by way of interchange of some or all of the described or illustrated elements. Where certain elements of the present disclosure can be partially or fully implemented using known components, only those portions of such known components that are necessary for an understanding of the present disclosure will be described, and detailed descriptions of other portions of such known components will be omitted so as not to obscure the disclosure. Embodiments described as being implemented in software should not be limited thereto, but can include embodiments implemented in hardware, or combinations of software and hardware, and vice-versa, as will be apparent to those skilled in the art, unless otherwise specified herein. In the present specification, an example showing a singular component should not be considered limiting; rather, the disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. The present disclosure encompasses present and future known equivalents to the known components referred to herein by way of illustration.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display (LCD) panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "projection optics," as used herein, should be broadly interpreted as encompassing various types of optical systems, including refractive optics, reflective optics, apertures and catadioptric optics, for example. The term "projection optics" may also include components operating according to any of these design types for directing, shaping, or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting or projecting radiation from the source before the radiation passes the (e.g., semiconductor) patterning device, or optical components for shaping, adjusting, or projecting the radiation after the radiation passes the patterning device. The projection optics generally exclude the source and the patterning device.

A (e.g., semiconductor) patterning device can comprise, or can form, one or more design layouts. The design layout can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between devices (such as gates, capacitors, etc.) or interconnect lines, so as to ensure that the devices or lines do not interact with one another in an undesirable way. The design rules may include or specify specific parameters, limits on ranges for parameters, or other information. One or more of the design rule limitations or parameters may be referred to as a "critical dimension" (CD). A critical dimension of a device can be defined as the smallest width of a line or hole or the smallest space between two lines or two holes, or other features. Thus, the CD determines the overall size and density of the designed device. One of the goals in device fabrication is to faithfully reproduce the original design intent on the substrate (via the patterning device).

The term "mask" or "patterning device" as employed in this text may be broadly interpreted as referring to a generic semiconductor patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include a programmable mirror array and a programmable LCD array.

An example of a programmable mirror array can be a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means. An example of a programmable LCD array is given in U.S. Pat. No. 5,229,872, which is incorporated herein by reference.

As used herein, the term "patterning process" generally means a process that creates an etched substrate by the application of specified patterns of light as part of a lithography process. However, "patterning process" can also include (e.g., plasma) etching, as many of the features described herein can provide benefits to forming printed patterns using etch (e.g., plasma) processing.

As used herein, the term "pattern" means an idealized pattern that is to be etched on a substrate (e.g., wafer).

As used herein, a "printed pattern" (or a pattern on a substrate) means the physical pattern on a substrate that was etched based on a target pattern. The printed pattern can include, for example, troughs, channels, depressions, edges, or other two and three dimensional features resulting from a lithography process.

As used herein, the term "prediction model", "process model", "electronic model", or "simulation model" (which may be used interchangeably) means a model that includes one or more models that simulate a patterning process. For example, a model can include an optical model (e.g., that models a lens system/projection system used to deliver light in a lithography process and may include modelling the final optical image of light that goes onto a photoresist), a resist model (e.g., that models physical effects of the resist, such as chemical effects due to the light), an optical proximity correction (OPC) model (e.g., that can be used to make target patterns and may include sub-resolution resist features (SRAFs), etc.), an etch (or etch bias) model (e.g., that simulates the physical effects of an etching process on a printed wafer pattern), or other models.

As used herein, the term "calibrating" means to modify (e.g., improve or tune) or validate something, such as a model.

A patterning system may be a system comprising any or all of the components described above, plus other components configured to performing any or all of the operations associated with these components. A patterning system may include a lithographic projection apparatus, a scanner, systems configured to apply or remove resist, etching systems, or other systems, for example.

As an introduction, FIG. 1 is a schematic diagram of a lithographic projection apparatus, according to some embodiments. The lithographic projection apparatus can include an illumination system IL, a first object table T, a second object table WT, and a projection system PS. Illumination system IL, can condition a beam B of radiation. In this example, the illumination system also comprises a radiation source SO. First object table (e.g., a patterning device table) T can be provided with a patterning device holder to hold a patterning device MA (e.g., a reticle), and connected to a first positioner to accurately position the patterning device with respect to item PS. Second object table (e.g., a substrate table) WT can be provided with a substrate holder to hold a substrate W (e.g., a resist-coated silicon wafer), and connected to a second positioner to accurately position the substrate with respect to item PS. Projection system (e.g., which includes a lens) PS (e.g., a refractive, catoptric or catadioptric optical system) can image an irradiated portion of the patterning device MA onto a target portion C (e.g., comprising one or more dies) of the substrate W. Patterning device MA and substrate W may be aligned using patterning device alignment marks M1, M2 and substrate alignment marks P1, P2, for example.

As depicted, the apparatus can be of a transmissive type (i.e., has a transmissive patterning device). However, in general, it may also be of a reflective type, for example (with a reflective patterning device). The apparatus may employ a different kind of patterning device for a classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander, or beam delivery system BD (comprising directing mirrors, the beam expander, etc.). for example. The illuminator IL may comprise adjusting means AD for setting the outer or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

In some embodiments, source SO may be within the housing of the lithographic projection apparatus (as is often the case when source SO is a mercury lamp, for example), but that it may also be remote from the lithographic projection apparatus. The radiation beam that it produces may be led into the apparatus (e.g., with the aid of suitable directing mirrors), for example. This latter scenario can be the case when source SO is an excimer laser (e.g., based on KrF, ArF or F2 lasing), for example.

The beam B can subsequently intercept patterning device MA, which is held on a patterning device table T. Having traversed patterning device MA, the beam B can pass through the lens PL, which focuses beam B onto target portion C of substrate W. With the aid of the second positioning means (and interferometric measuring means IF), the substrate table WT can be moved accurately, e.g. to position different target portions C in the path of beam B. Similarly, the first positioning means can be used to accurately position patterning device MA with respect to the path of beam B, e.g., after mechanical retrieval of the patterning device MA from a patterning device library, or during a scan. In general, movement of the tables T, WT can be realized with the aid of a long-stroke module (coarse positioning) and a short-stroke module (fine positioning). However, in the case of a stepper (as opposed to a step-and-scan tool), patterning device table T may be connected to a short stroke actuator, or may be fixed.

The depicted tool can be used in two different modes, step mode and scan mode. In step mode, patterning device table T is kept essentially stationary, and an entire patterning device image is projected in one operation (i.e., a single "flash") onto a target portion C. Substrate table WT can be shifted in the x or y directions so that a different target portion C can be irradiated by beam B. In scan mode, essentially the same scenario applies, except that a given target portion C is not exposed in a single "flash." Instead, patterning device table T is movable in a given direction (e.g., the "scan direction", or the "y" direction) with a speed v, so that projection beam B is caused to scan over a patterning device image. Concurrently, substrate table WT is simultaneously moved in the same or opposite direction at a speed V=Mv, in which M is the magnification of the lens (typically, M=¼ or ⅕). In this manner, a relatively large target portion C can be exposed, without having to compromise on resolution.

Figure 2:
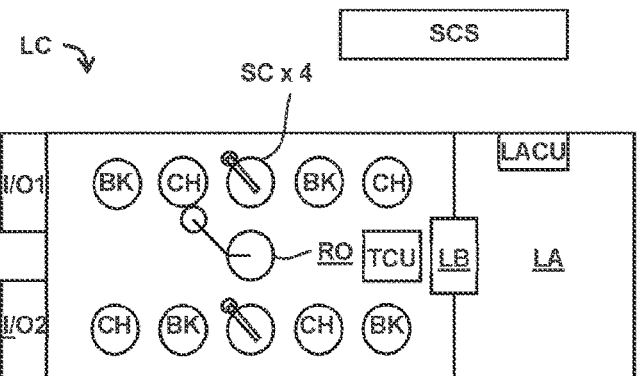
FIG. 2 depicts a schematic overview of a lithographic cell, consistent with embodiments of the present disclosure.

FIG. 2 depicts a schematic overview of a lithographic cell LC. As shown in FIG. 2, a lithographic projection apparatus (shown in FIG. 1 and illustrated as lithographic apparatus LA in FIG. 2) may form part of lithographic cell LC, also sometimes referred to as a lithocell or (litho)cluster, which often also includes apparatus to perform pre- and post-exposure processes on a substrate W. Conventionally, these include spin coaters SC configured to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W (FIG. 1) exposed by the lithographic apparatus LA to be exposed correctly and consistently, it is desirable to inspect substrates to measure properties of patterned structures, such as feature edge placement, overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W (FIG. 1), and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties using an actual substrate (e.g., a charged particle—SEM—image of a wafer pattern) or an image of an actual substrate, on a latent image (image in a resist layer after the exposure), on a semi-latent image (image in a resist layer after a post-exposure bake step PEB), on a developed resist image (in which the exposed or unexposed parts of the resist have been removed), on an etched image (after a pattern transfer step such as etching), or in other ways.

Figure 3:
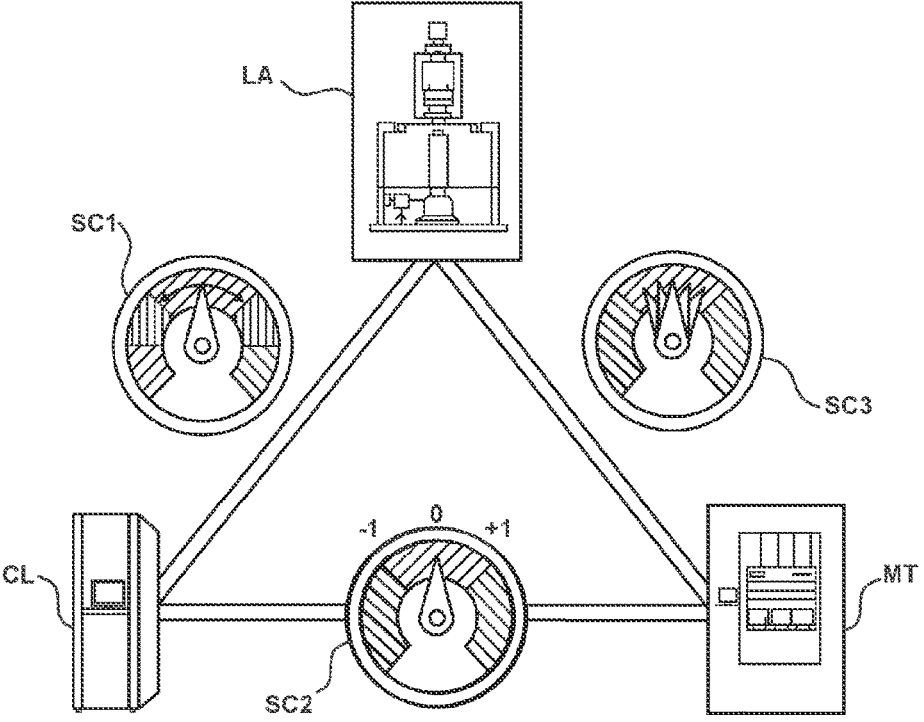
FIG. 3 depicts a schematic representation of holistic lithography, representing a cooperation between three technologies to optimize semiconductor manufacturing, consistent with embodiments of the present disclosure.

FIG. 3 depicts a schematic representation of holistic lithography, representing a cooperation between three technologies to optimize semiconductor manufacturing. Typically, the patterning process in a lithographic apparatus LA is one of the most critical steps in the processing which requires high accuracy of dimensioning and placement of structures on the substrate W (FIG. 1). To ensure this high accuracy, three systems (in this example) may be combined in a so called "holistic" control environment as schematically depicted in FIG. 3. One of these systems is the lithographic apparatus LA which is (virtually) connected to a metrology apparatus (e.g., a metrology tool) MT (a second system), and to a computer system CL (a third system). A "holistic" environment may be configured to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) a design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology apparatus (tool) MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequent measurements of the structures created, e.g., for process control and verification. Tools to make such measurements include metrology tool (apparatus) MT. Different types of metrology tools MT for making such measurements are known, including scanning electron microscopes (SEM) or various forms of scatterometer metrology tools MT. In some embodiments, metrology tools MT are or include an SEM.

In some embodiments, metrology tools MT are or include a spectroscopic scatterometer, an ellipsometric scatterometer, or other light based tools. A spectroscopic scatterometer may be configured such that the radiation emitted by a radiation source is directed onto target features of a substrate and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra. An ellipsometric scatterometer allows for determining parameters of a lithographic process by measuring scattered radiation for each polarization states. Such a metrology tool (MT) emits polarized light (such as linear, circular, or elliptic) by using, for example, appropriate polarization filters in the illumination section of the metrology apparatus. A source suitable for the metrology apparatus may provide polarized radiation as well.

Figure 4:
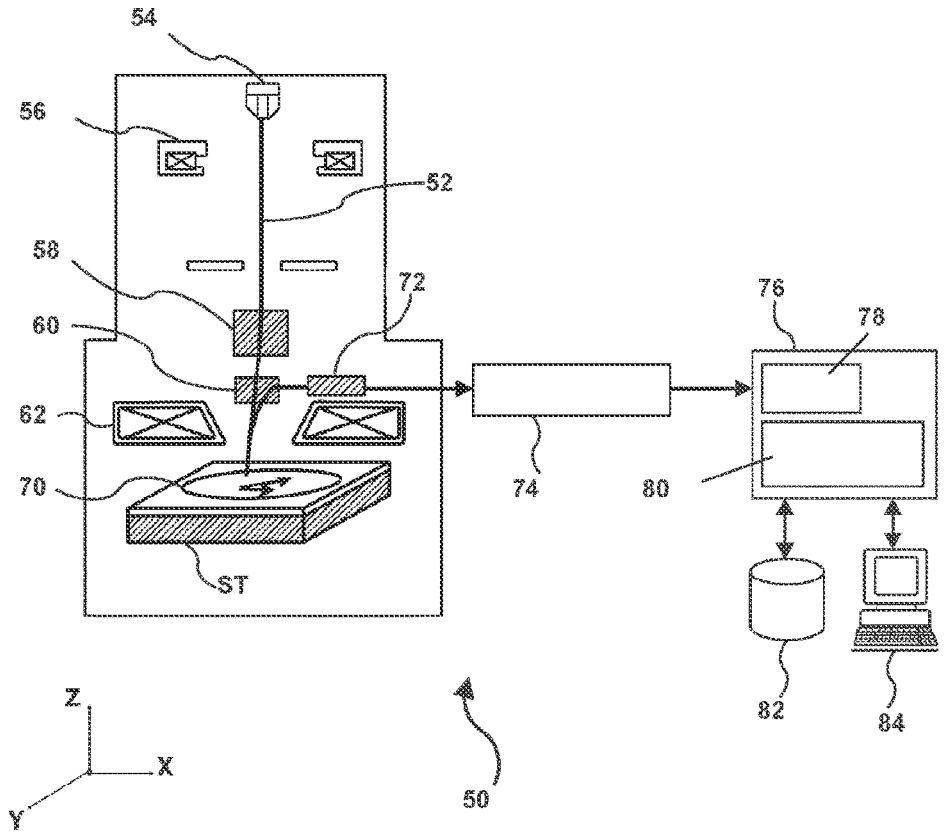
FIG. 4 schematically depicts an example of a charged particle (e.g., an electron beam) inspection apparatus, consistent with embodiments of the present disclosure.

As described above, fabricated devices (e.g., patterned substrates) may be inspected at various points during manufacturing. FIG. 4 schematically depicts a generalized example of a charged particle (electron beam) inspection apparatus (system) 50. In some embodiments, inspection apparatus 50 may be an electron beam or other charged particle inspection apparatus (e.g., the same as or similar to a scanning electron microscope (SEM)) that yields an image of a structure (e.g., some or all the structure of a device, such as an integrated circuit) exposed or transferred on a substrate. A primary electron beam 52 emitted from an electron source 54 is converged by condenser lens 56 and then passes through a beam deflector 58, an E x B deflector 60, and an objective lens 62 to irradiate a substrate 70 on a substrate table ST at a focus.

When the substrate 70 is irradiated with electron beam 52, secondary electrons are generated from the substrate 70. The secondary electrons are deflected by the E x B deflector 60 and detected by a secondary electron detector 72. A two-dimensional electron beam image can be obtained by detecting the electrons generated from the sample in synchronization with, e.g., two dimensional scanning of the electron beam by beam deflector 58 or with repetitive scanning of electron beam 52 by beam deflector 58 in an X or Y direction, together with continuous movement of the substrate 70 by the substrate table ST in the other of the X or Y direction. Thus, in some embodiments, the electron beam inspection apparatus has a field of view for the electron beam defined by the angular range into which the electron beam can be provided by the electron beam inspection apparatus (e.g., the angular range through which the deflector 60 can provide the electron beam 52). Thus, the spatial extent of the field of the view is the spatial extent to which the angular range of the electron beam can impinge on a surface (wherein the surface can be stationary or can move with respect to the field).

As shown in FIG. 4, a signal detected by secondary electron detector 72 may be converted to a digital signal by an analog/digital (A/D) converter 74, and the digital signal may be sent to an image processing system 76. In some embodiments, the image processing system 76 may have memory 78 to store all or part of digital images for processing by a processing unit 80. The processing unit 80 (e.g., specially designed hardware or a combination of hardware and software or a computer readable medium comprising software) is configured to convert or process the digital images into datasets representative of the digital images. In some embodiments, the processing unit 80 is configured or programmed to cause execution of an operation (e.g., SEM inspection) described herein. Further, image processing system 76 may have a storage medium 82 configured to store the digital images and corresponding datasets in a reference database. A display device 84 may be connected with the image processing system 76, so that an operator can conduct necessary operation of the equipment with the help of a graphical user interface.

Figure 5:
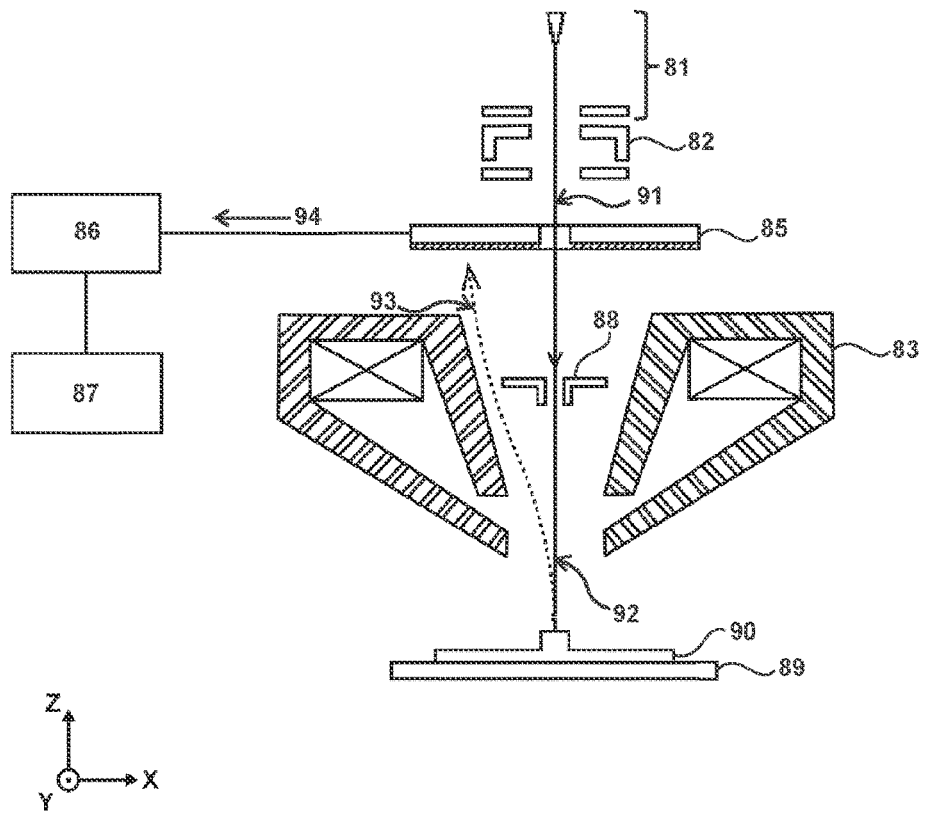
FIG. 5 schematically illustrates an example of an inspection apparatus, consistent with embodiments of the present disclosure.

FIG. 5 schematically illustrates an example of a charged particle inspection apparatus (system). The apparatus is used to inspect a sample 90 (such as a patterned substrate) on a sample stage 89 and comprises a charged particle beam generator 81, a condenser lens module 99, a probe forming objective lens module 83, a charged particle beam deflection module 88, a secondary charged particle detector module 85, an image forming module 86, or other components. The charged particle beam generator 81 generates a primary charged particle beam 91. The condenser lens module 99 condenses the generated primary charged particle beam 91.

The probe forming objective lens module 83 focuses the condensed primary charged particle beam into a charged particle beam probe 92. The charged particle beam deflection module 88 scans the formed charged particle beam probe 92 across the surface of an area of interest on the sample 90 secured on the sample stage 89. In some embodiments, the charged particle beam generator 81, the condenser lens module 83, and the probe forming objective lens module 83, or their equivalent designs, alternatives, or any combination thereof, together form a charged particle beam probe generator which generates the scanning charged particle beam probe 92.

The secondary charged particle detector module 85 detects secondary charged particles 93 emitted from the sample surface (maybe also along with other reflected or scattered charged particles from the sample surface) upon being bombarded by the charged particle beam probe 92 to generate a secondary charged particle detection signal 94. The image forming module 86 (e.g., a computing device) is coupled with the secondary charged particle detector module 85 to receive the secondary charged particle detection signal 94 from the secondary charged particle detector module 85 and accordingly form at least one scanned image. In some embodiments, the secondary charged particle detector module 85 and image forming module 86, or their equivalent designs, alternatives, or any combination thereof, together form an image forming apparatus which forms a scanned image from detected secondary charged particles emitted from sample 90 being bombarded by the charged particle beam probe 92.

In some embodiments, a monitoring module 87 is coupled to the image forming module 86 of the image forming apparatus to monitor, control, etc. the patterning process or derive a parameter for patterning process design, control, monitoring, etc. using the scanned image of the sample 90 received from image forming module 86. In some embodiments, the monitoring module 87 is configured or programmed to cause execution of an operation described herein. In some embodiments, the monitoring module 87 comprises a computing device. In some embodiments, the monitoring module 87 comprises a computer program configured to provide functionality described herein. In some embodiments, a probe spot size of the electron beam in the system of FIG. 5 is significantly larger compared to, e.g., a CD, such that the probe spot is large enough so that the inspection speed can be fast. However, the resolution may be lower because of the large probe spot.

As described above, it may be desirable to use one or more tools to produce results that, for example, can be used to design, control, monitor, etc., a patterning process. One or more tools used in computationally controlling, designing, etc. one or more aspects of the patterning process, such as the pattern design for a patterning device (including, for example, adding sub-resolution assist features or optical proximity corrections), the illumination for the patterning device, etc., may be provided. Accordingly, in a system for computationally controlling, designing, etc. a manufacturing process involving patterning, the manufacturing system components or processes can be described by various functional modules or models. In some embodiments, one or more electronic (e.g., mathematical, parameterized, etc.) models may be provided that describe one or more steps or apparatuses of the patterning process. In some embodiments, a simulation of the patterning process can be performed using one or more electronic models to simulate how the patterning process forms a patterned substrate using a design pattern provided by a patterning device.

Images, from, e.g., the system of FIG. 4 or FIG. 5, may be processed to extract dimensions, shapes, contours, or other information that describe the edges of objects, representing semiconductor device structures, in the image. The shapes, contours, or other information may be quantified via metrics, such as edge placement error (EPE), CD, etc. at user-defined cut-lines or in other locations. These shapes, contours, or other information may be used to optimize a patterning process, for example.

In some embodiments, optimization of a patterning process may be represented as a cost function. The optimization process may comprise finding a set of parameters (design variables, process variables, etc.) of the patterning process that minimizes the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics. The cost function can also be the maximum of these deviations (i.e., worst deviation). The term "evaluation points" should be interpreted broadly to include any characteristics of the system or fabrication method. The design or process variables of the patterning process can be confined to finite ranges or be interdependent due to practicalities of implementations of the system or method. In the case of a lithographic projection apparatus, the constraints are often associated with physical properties and characteristics of the hardware such as tunable ranges, or patterning device manufacturability design rules. The evaluation points can include physical points in an image of a substrate, as well as non-physical characteristics such as one or more etching parameters, dose, and focus, etc., for example.

In some embodiments, optimization of a patterning process may be based on inspection data obtained from a non-production, test, or mask check wafer. Such a wafer is not subject to pressures from a production schedule, throughput requirements, yield or quality requirements, or other requirements of a regular production patterning process.

Focus, dose, or other patterning process parameters may be fundamental parameters for a lithography process, and it is advantageous to be able to accurately determine such parameters using a printed wafer (patterned substrate). Current optically based methods such as Diffraction Based Focus (DBF) and Astigmatism Based Focus (ABF) require specially designed marks to be printed on a wafer. The size of the marks reduces a usable area of the wafer (e.g., which reduces the number of ICs that can be produced on a given wafer). These methods also require special optical proximity correction (OPC) considerations, and do not provide information about an actual IC device (instead providing information about the specially designed marks which are used as substitutes for actual IC devices). In addition, methods such as DBF are not suitable for EUV applications at least because of the thickness of the resist layer associated with an EUV patterning process. Finally, none of these methods can provide information about multiple different patterning process parameters (e.g., dose and focus) with a single measurement.

Advantageously, the present disclosure describes techniques for determining one or more patterning parameters used by a patterning system, using a charged particle inspection system. The one or more patterning parameters are determined based on measurements taken directly from features of a patterned substrate (e.g., not special marks that are not part of an IC). The techniques do not require special OPC considerations and can determine multiple patterning process parameters based on information from a single measurement.

Figure 6A:
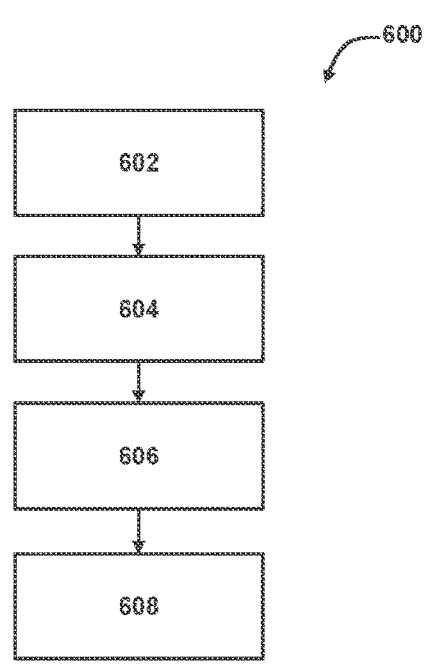
FIG. 6A illustrates a method for determining one or more patterning parameters used by a patterning system, using a charged particle inspection system, consistent with embodiments of the present disclosure.

FIG. 6A illustrates an exemplary method 600 for determining one or more patterning parameters used by a patterning system. The one or more patterning parameters are determined based on dimensions from an inspection of a patterned substrate using a charged particle inspection system. Method 600 comprises inspecting (operation 602) the patterned substrate (e.g., a wafer) with the charged particle inspection system (e.g., an SEM), determining (operation 604) the one or more patterning parameters based on a relationship between the one or more patterning parameters and one or more determined dimensions of the patterned substrate, determining (operation 606) an offset between a determined patterning parameter and a corresponding set point of the patterning system, and adjusting (operation 608) the patterning system based on the offset, or other operations. By way of one possible example, the one or more patterning parameters may be dose and focus, the patterning system may be a scanner used to pattern a substrate such as a semiconductor wafer, and the charged particle inspection system may be an SEM.

In some embodiments, a non-transitory computer readable medium stores instructions which, when executed by a computer, cause the computer to execute one or more of operations 602-608, or other operations. The operations of method 600 are intended to be illustrative. In some embodiments, method 600 may be accomplished with one or more additional operations not described, or without one or more of the operations discussed. For example, in some embodiments, operations 606 or 608 may be eliminated from method 600. Additionally, the order in which the operations of method 600 are illustrated in FIG. 6A and described herein is not intended to be limiting.

At operation 602, the patterned substrate is inspected with the charged particle inspection system. The patterned substrate is inspected to determine one or more dimensions of the patterned substrate, detect defects, or determine other information. The one or more determined dimensions comprise critical dimension (CD), critical dimension uniformity (CDU), edge placement error (EPE), local placement error (LPE), local critical dimension uniformity (LCDU), line edge roughness (LER), and line width roughness (LWR), or other dimensions. Defects may include pattern shifts, stochastic defects, and/or other defects.

The charged particle inspection system can be or include a scanning electron microscope (e.g., as shown in FIGS. 4 and 5 and described above), for example, or other charged particle inspection systems such as a multi-beam charged particle inspection system. The charged particle inspection system is configured to generate images that include information describing the geometrical shapes of contours in a pattern, or information related to the geometrical shapes. The geometrical shapes of the contours in the pattern may be two dimensional geometrical shapes, for example. The images include data that describes the characteristics of the contours (e.g., such as X-Y dimensional data points, a mathematical equation that describes a geometrical shape, etc.), processing parameters associated with the contour, or other data. The images may further include 3D information, such as information about features that are buried in one or more sub-layers, data from prior inspections of prior layers, information selected and input by a user operating inspection system that generates the inspection images, or other information.

The patterned substrate is produced using the patterning system and the one or more patterning parameters. In some embodiments, the patterned substrate is produced with a lithography system, which may be or include LA described above, another scanner, or other components, associated with a patterning process, or a separate lithography system.

At operation 604, the one or more patterning parameters are determined. In some embodiments, the one or more patterning parameters (and the patterning system) are associated with an extreme ultra violet (EUV) patterning process. The one or more patterning parameters may comprise focus and dose for an EUV patterning process, for example, or other parameters. The one or more patterning parameters are determined based on a relationship between the one or more patterning parameters and one or more determined dimensions of the patterned substrate.

The relationship is determined based on training dimensions from a training substrate patterned with one or more training parameters varied across a patterning process window. The training substrate is inspected using the charged particle inspection system with a minimum threshold number of pattern types in the field of view at the same time. The training substrate may be a non-production, test, or mask check wafer. Such a wafer is not subject to pressures from a production schedule, throughput requirements, yield or quality requirements, or other requirements of a regular production patterning process. The non-production wafer can utilize a different patterning process than a production wafer (which uses a regular production patterning process), including different patterning parameter set points varied across a process window compared to what would be used in the regular production patterning process.

The charged particle inspection system has a relatively wide field of view compared to other charged particle inspection systems. For example, the charged particle inspection system may have a field of view that is at least two micrometers wide. In some embodiments, the charged particle inspection system may have a field of view that is at least three micrometers wide. In some embodiments, the charged particle inspection system may have a field of view that is at least four micrometers wide. In some embodiments, the charged particle inspection system may have a field of view that is at least five micrometers wide.

The relatively wide field of view facilitates inspection of a minimum threshold number of pattern types in the field of view at the same time. In some embodiments, the minimum threshold number of pattern types is five pattern types. In some embodiments, the minimum threshold number of pattern types is four pattern types. In some embodiments, the minimum threshold number of pattern types is three pattern types. In some embodiments, the minimum threshold number of pattern types is two pattern types.

A pattern type comprises one of more features of the patterned substrate that respond differently to variation of patterning parameters across a patterning process window. A pattern type that responds differently to variation of patterning parameters may respond differently to variation in focus or dose, as two non-limiting examples of patterning parameters. Responding differently may refer to dimensions (e.g., CD, LCDU, LPE, EPE, etc.) that change differently from one pattern type to another (which can be analyzed via multivariable regression or other methods to determine information as described below), as one or more patterning parameters are changed (e.g., focus, dose, etc.) For example, a pattern type that responds differently to variation in parameters may include differently shaped features (e.g., a round via versus an elliptical via) in a pattern, the same feature surrounded by different structures (e.g., a round via surrounded by a first set of other structures versus a round via surrounded by a second set of other structures) in the pattern, or other pattern types.

A patterning process window comprises variations of the one or more patterning parameters associated with the regular production patterning process. In some embodiments, the regular patterning process is a semiconductor manufacturing process. A regular production patterning process may include any patterning process used in the normal course of producing a volume of patterned substrates. A regular production patterning process may have several process steps, which each have parameters that define a process window used to produce a patterned substrate (which may include functional integrated circuits, for example). Here, patterning a training substrate with one or more training parameters varied across a patterning process window may comprise patterning the training substrate according to a focus exposure matrix (FEM) with focus and dose parameter set point values each varied in a random (but recorded) manner across a typical process window for focus and dose values during the patterning.

Training dimensions are determined from the training substrate using the charged particle inspection system. As described above, the charged particle inspection system has a field of view (e.g., two micrometers wide) configured to include a minimum threshold number of pattern types (e.g., three pattern types) on the training substrate in the field of view. The training dimensions are determined based on the minimum threshold number of pattern types in the field of view. Determining the training dimensions with the minimum threshold number of pattern types in the field of view generates more independent dimensional values that provide more information (compared to dimensions from a single pattern type) to a regression or machine learning model, and enhances the predictive quality of the determined relationship between the measured dimensions and patterning process parameters used to produce a patterned substrate (described in more detail below).

In some embodiments, the relationship between patterning parameters and determined dimensions is determined using multivariable regression. Multivariable regression comprises a mathematical process for determining a relationship between multiple dependent variables (e.g., focus, dose, or other patterning parameters) and multiple independent variables (e.g., the measured dimensions described above such as CD, CDU, EPE, LPE, etc.). Continuing with the example patterning parameters and measured dimensions described above, multivariable regression uses the measured dimensions (CD, CDU, EPE, LPE, etc.) and random (but recorded) focus and dose set point values to determine a relationship between the measured dimensions and the patterning parameters. The relationship can then be used to predict or otherwise determine patterning parameters for a new patterned substrate based on measured dimensions from that new patterned substrate (e.g., measured in the same measurement locations). In some embodiments, measured dimensions used as input for the multivariable regression comprise different polynomial orders of the input dimensions to improve prediction accuracy, or for other reasons. This improves prediction accuracy because a specific dimension may not respond to changing process parameters linearly, for example. In some embodiments, the multivariable regression comprises linear regression, polynomial regression, machine learning based non-linear regression, or other regression.

In some embodiments, the relationship between patterning parameters and determined dimensions is determined by a machine learning based prediction model trained using the training dimensions and the training parameters. In other words, determining the relationship comprises training the model. The machine learning based prediction model is trained by providing corresponding pairs of training dimensions and training parameters to the machine learning based prediction model as input.

In some embodiments, the machine learning based prediction model may be or include mathematical equations, algorithms, plots, charts, networks (e.g., neural networks), or other tools and machine learning model components. For example, the machine learning model may be or include one or more neural networks having an input layer, an output layer, and one or more intermediate or hidden layers. In some embodiments, the one or more neural networks may be or include deep neural networks (e.g., neural networks that have one or more intermediate or hidden layers between the input and output layers).

As an example, the one or more neural networks may be based on a large collection of neural units (or artificial neurons). The one or more neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that a signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, the one or more neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for the one or more neural networks may be freer flowing, with connections interacting in a more chaotic and complex fashion. In some embodiments, the intermediate layers of the one or more neural networks include one or more convolutional layers, one or more recurrent layers, or other layers.

The one or more neural networks may be trained (i.e., whose parameters are determined) using a set of training data (e.g., ground truths). The training data may include a set of training samples. Each sample may be a pair comprising an input object (e.g., one or more measured dimensions from a patterned training substrate) and a desired output value (also called the supervisory signal—e.g., a known focus or dose used to produce the patterned training substrate). A training algorithm analyzes the training data and adjusts the behavior of the neural network by adjusting the parameters (e.g., weights of one or more layers) of the neural network based on the training data. For example, given a set of N training samples of the form $\{(x_1, y_1), (x_2, y_2), \ldots, (x_N, y_N)\}$ such that $x_i$ is a feature vector of the i-th example (e.g., measured dimension) and is its supervisory signal (e.g., one or more known patterning parameters), a training algorithm seeks a neural network $g:X \rightarrow Y$, where X is the input space and Y is the output space. A feature vector is an n-dimensional vector of numerical features that represent some object (e.g., a wafer dimension, etc.). After training, the neural network may be used for making predictions using new samples (e.g., regular production wafers). In some embodiments, operation 604 comprises applying the trained model (trained on the dimensions from the training substrate), using the dimensions determined from a regular production substrate as input (e.g., measured in the same measurement locations that were used on the training substrate), to determine (or output) the one or more patterning parameters (e.g., focus and dose).

At operation 606, an offset between a determined patterning parameter and a corresponding set point of the patterning system is determined (if such an offset exists). An offset is a difference between a determined patterning parameter and a corresponding set point of the patterning system. For example, the set point for dose or focus used in a patterning process to produce a patterned wafer may be D1 or F1. However, multivariable regression or the machine learning based prediction model described above may determine, based on dimensions from a patterned substrate determined by the charged particle inspection system, that the actual dose or focus used by a scanner for a patterning process was D2 or F2. In some embodiments, there may be no different between these values. However, such differences (e.g., D1 versus D2 or F1 versus F2) may cause changes in a patterning process that produce defects in a patterned wafer, hamper throughput, or have other consequences.

At operation 608, the patterning system is adjusted (if necessary) based on the offset. Adjusting the patterning system may include varying one or more patterning parameters of the patterning system. The patterning parameters may be automatically or otherwise electronically adjusted by a processor (e.g., a computer controller), modulated manually by a user, or adjusted in other ways. In some embodiments, patterning process parameter adjustments may be determined (e.g., an amount a given parameter should be changed), and the patterning process parameters may be adjusted from prior parameter set points to new parameter set points, for example. In some embodiments, the determined or adjusted patterning process parameters comprise dose or focus, but may also or instead include a pupil shape, a power setting, or other semiconductor device manufacturing process parameters. As an example, if the process parameter was a new dose, a scanner could be adjusted from an old or previous dose, to the determined (e.g., new) dose. Several other similar examples are contemplated.

Figure 6B:
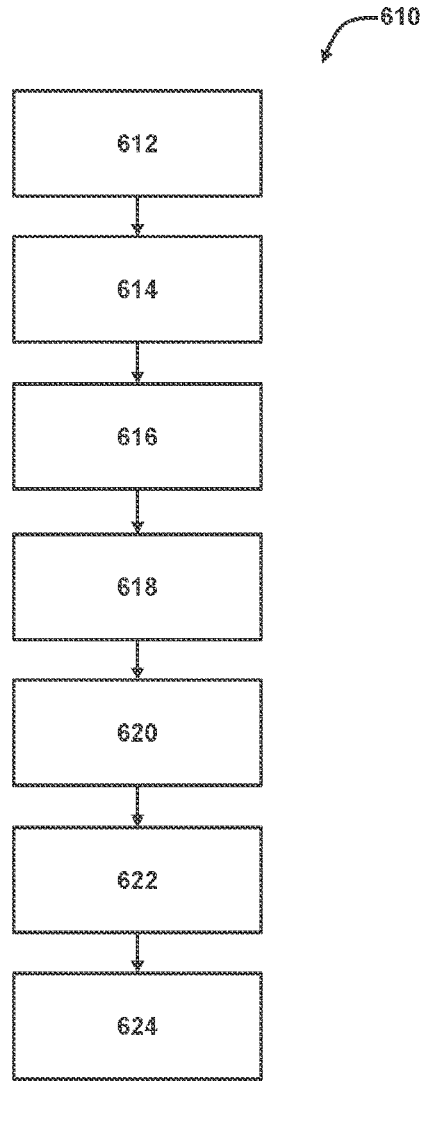
FIG. 6B illustrates another method for determining one or more patterning parameters used by a patterning system, using a charged particle inspection system, consistent with embodiments of the present disclosure.
Figure 6C:
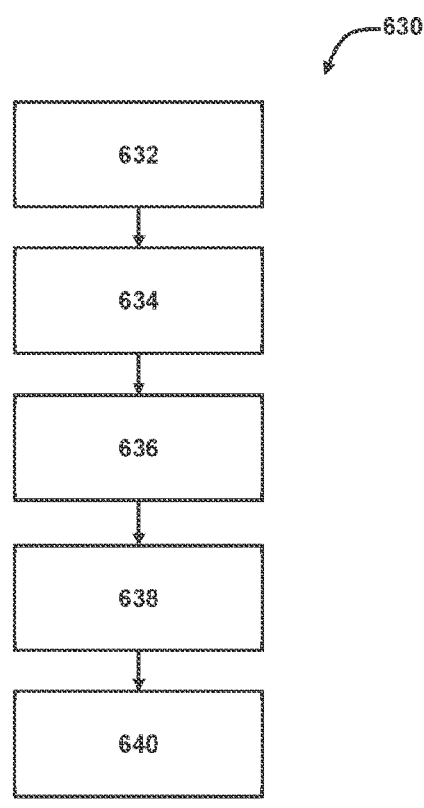
FIG. 6C illustrates yet another method for determining one or more patterning parameters used by a patterning system, using a charged particle inspection system, consistent with embodiments of the present disclosure.

FIGS. 6B and 6C illustrate additional or alternative methods 610 and 630 for determining one or more patterning parameters used by a patterning system, using a charged particle inspection system. In some embodiments, one or more of the operations of methods 610 or 630 may be the same as or overlap with one or more of the operations of method 600 described above. In some embodiments, one or more of the operations of methods 610 or 630 may be used in conjunction with one or more of the operations of method 600. In some embodiments, each of the operations of methods 600, 610, and 630 may be mixed and matched to form a method not shown in FIG. 6A, 6B, or 6C, but whose operations are each described herein.

In some embodiments, like method 600 shown in FIG. 6A, a non-transitory computer readable medium (e.g., the same or similar medium to that associated with the operations of FIG. 6A) stores instructions which, when executed by a computer, cause the computer to execute one or more of operations 612-624 (FIG. 6B), operations 632-640 (FIG.

6C), or other operations. The operations of methods 610 and 630 are also intended to be illustrative. In some embodiments, methods 610 and 630 may be accomplished with one or more additional operations not described, or without one or more of the operations discussed. Additionally, the order in which the operations of methods 610 and 630 are illustrated in FIGS. 6B and 6C and described herein is not intended to be limiting. As described above, many of the operations of methods 610 and 630 correspond to the operations of method 600 described above, and the descriptions of the operations of method 600 apply to the corresponding operations of methods 610 and 630 (and so may not be repeated below).

Method 610 comprises patterning (operation 612) a training substrate with one or more training parameters varied across a process window, determining (operation 614) training dimensions from the training substrate, determining (operation 616) a relationship between the training parameters and the training dimensions, inspecting (operation 618) a patterned substrate with the charged particle inspection system to determine one or more dimensions of the patterned substrate, determining (operation 620) the one or more patterning parameters based on the relationship and one or more determined dimensions of the patterned substrate, determining (operation 622) an offset between a determined patterning parameter and a corresponding set point of a patterning system, and adjusting (operation 624) the patterning system based on the offset, or other operations. In some embodiments, the one or more patterning parameters and the patterning system are associated with an extreme ultra violet (EUV) patterning process. In some embodiments, the patterning system is or includes a scanner used in a semiconductor lithography process, and the charged particle inspection system is an SEM.

At operation 612 a training substrate is patterned using one or more training parameters varied across a process window. The process window comprises variations of the one or more patterning parameters associated with a regular production patterning process. In some embodiments, the training parameters comprise training doses, training focuses (varied across an FEM matrix), or other training parameters (e.g., as described above).

At operation 614 training dimensions from the training substrate are determined. The training dimensions are determined using the charged particle inspection system. The charged particle inspection system has a field of view (e.g., at least two micrometers wide) configured to include a minimum threshold number of pattern types on the training substrate in the field of view (e.g., as described above). Again, a pattern type comprises one of more features of the patterned substrate that respond differently to variation of the training parameters across the process window. The training dimensions are determined based on the minimum threshold number of pattern types in the field of view (e.g., three pattern types). In some embodiments, the training dimensions comprise critical dimension (CD), critical dimension uniformity (CDU), edge placement error (EPE), local placement error (LPE), or other dimensions.

At operation 616 a relationship between the training parameters and the training dimensions is determined. The relationship is determined (1) using multivariable regression or (2) by a machine learning based prediction model trained using the training dimensions and the training parameters. Multivariable regression comprises linear regression, polynomial regression, machine learning based non-linear regression, or other regression. The machine learning based prediction model is trained by providing corresponding pairs of training dimensions and training parameters to the machine learning based prediction model as input (e.g., as described above).

At operation 618 a patterned substrate is inspected with the charged particle inspection system to determine one or more dimensions of the patterned substrate. The patterned substrate is produced using the patterning system and the one or more patterning parameters. As described above, the one or more patterning parameters may be or include a specific focus and dose.

At operation 620, the one or more patterning parameters are determined based on the relationship and one or more determined dimensions of the patterned substrate. For example, the one or more determined dimensions may be used as input for the multivariable regression, or the machine learning based prediction model, when then output the one or more patterning parameters based on the input.

At operation 622, an offset between a determined patterning parameter and a corresponding set point of the patterning system is determined. At operation 624, the patterning system is adjusted based on the offset.

Method 630 comprises determining (operation 632) a relationship between training parameters and training dimensions, inspecting (operation 634) a production substrate (e.g., a wafer) with a charged particle inspection system (e.g., an SEM), applying (operation 636) the relationship to determine the one or more patterning parameters based on the determined dimensions of the patterned substrate, determining (operation 638) an offset between a determined patterning parameter and a corresponding set point of a patterning system, and adjusting (operation 640) the patterning system based on the offset, or other operations. As with method 610, in some embodiments, the one or more patterning parameters and the patterning system are associated with an extreme ultra violet (EUV) patterning process. In some embodiments, the patterning system is or includes a scanner used in a semiconductor lithography process, and the charged particle inspection system is an SEM.

At operation 632, a relationship between training parameters and training dimensions is determined. As described above, a training substrate is patterned with one or more training parameters varied across a process window. Training dimensions are determined from the training substrate, using the charged particle inspection system; and the relationship is determined (1) using multivariable regression or (2) by a machine learning based prediction model trained using the training dimensions and the training parameters.

At operation 634, a production substrate (e.g., a wafer) is inspected with a charged particle inspection system (e.g., an SEM). The production substrate is produced using the patterning system and the one or more patterning parameters. A production substrate may be produced with a regular patterning process. As described above, the regular patterning process is a semiconductor manufacturing process. A regular production patterning process may include any patterning process used in the normal course of producing a volume of patterned substrates. A regular production patterning process may have several process steps, which each have parameters that define a process window used to produce a patterned substrate (which may include functional integrated circuits, for example).

At operation 636, the relationship is applied to determine the one or more patterning parameters based on the determined dimensions of the patterned substrate. This may comprise applying the trained model (trained on the dimensions from the training substrate), using the dimensions determined from a regular production patterned substrate as input (e.g., based on one or more determined dimensions of a patterned substrate), to determine (or output) the one or more patterning parameters (e.g., focus and dose). This may also comprise using the relationship determined by the multivariable regression, and the dimensions determined from the regular production patterned substrate as input, to determine (or output) the one or more patterning parameters.

At operation 638, an offset between a determined patterning parameter and a corresponding set point of the patterning system is determined. At operation 640, the patterning system is adjusted based on the offset (as described above).

Figure 7:
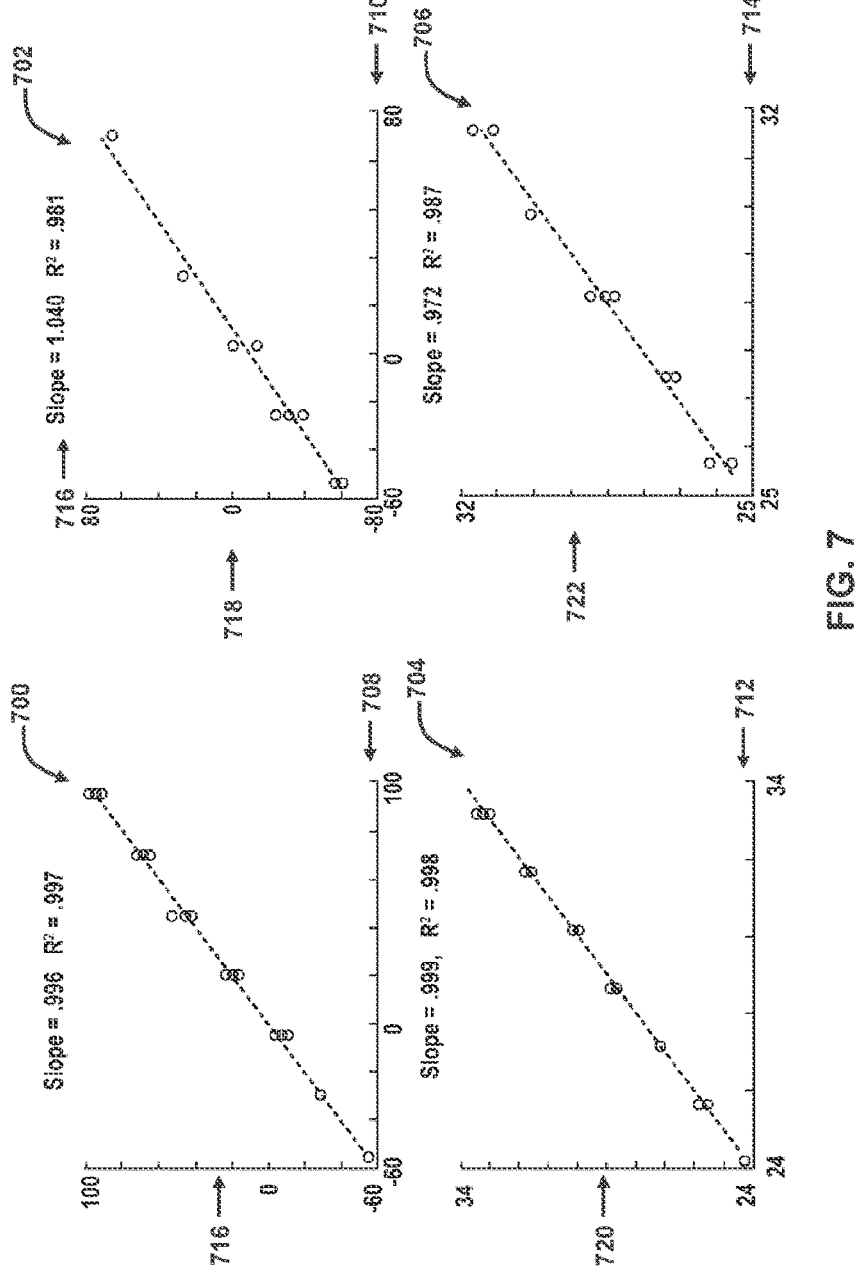
FIG. 7 illustrates a prediction versus input correlation example using the techniques described herein, consistent with embodiments of the present disclosure.

FIG. 7 illustrates a prediction versus input correlation example using the techniques described herein. In other words, FIG. 7 illustrates proof that the techniques described herein work as expected. FIG. 7 illustrates correlations 700, 702, 704, and 706 between process parameter set points 708, 710, 712, and 714, and process parameter determinations (predictions) 716, 718, 720, 722 made via multivariable regression or a machine learning based prediction model, as described herein. Correlations 700 and 704 were made during a training phase, and correlations 702 and 706 were made during a verification phase. Correlations 700 and 702 were made for focus, and correlations 704 and 706 were made for dose. As shown in FIG. 7, each slope and $R^2$ (goodness of fit) value is very near 1.000, indicating a strong correlation between process parameter set points 708-714 and process parameter determinations (predictions) 716-722.

To generate the data shown in FIG. 7, multiple training wafers were exposed according to a focus exposure matrix (FEM—as described above). CD and CDU data were determined for five different pattern types. As shown in FIG. 7, using the techniques described herein resulted in over 95% patterning parameter determination (prediction) accuracy for both focus and dose. Unlike the existing technology, this result was obtained by taking measurements within the production pattern feature area (not on specialize marks), using and actual IC pattern, and both dose and focus were determined using the same data for the imaged area.

To generate the data shown in FIG. 7, about 90% of the obtained data was used to train the regression or machine learning based model (e.g., used in the training phase described above), and the rest of the data was used to verify the patterning parameter determination (prediction) accuracy (e.g., used in the verification phase described above). For the verification phase (correlations 702 and 706), the focus prediction (see correlation 702) has about 98.1% of $R^2$ correlation (about +/−10 nm of focus accuracy); and the dose prediction (see correlation 706) has about 98.7% of $R^2$ (about +/−0.3 mJ of dose accuracy).

Figure 8:
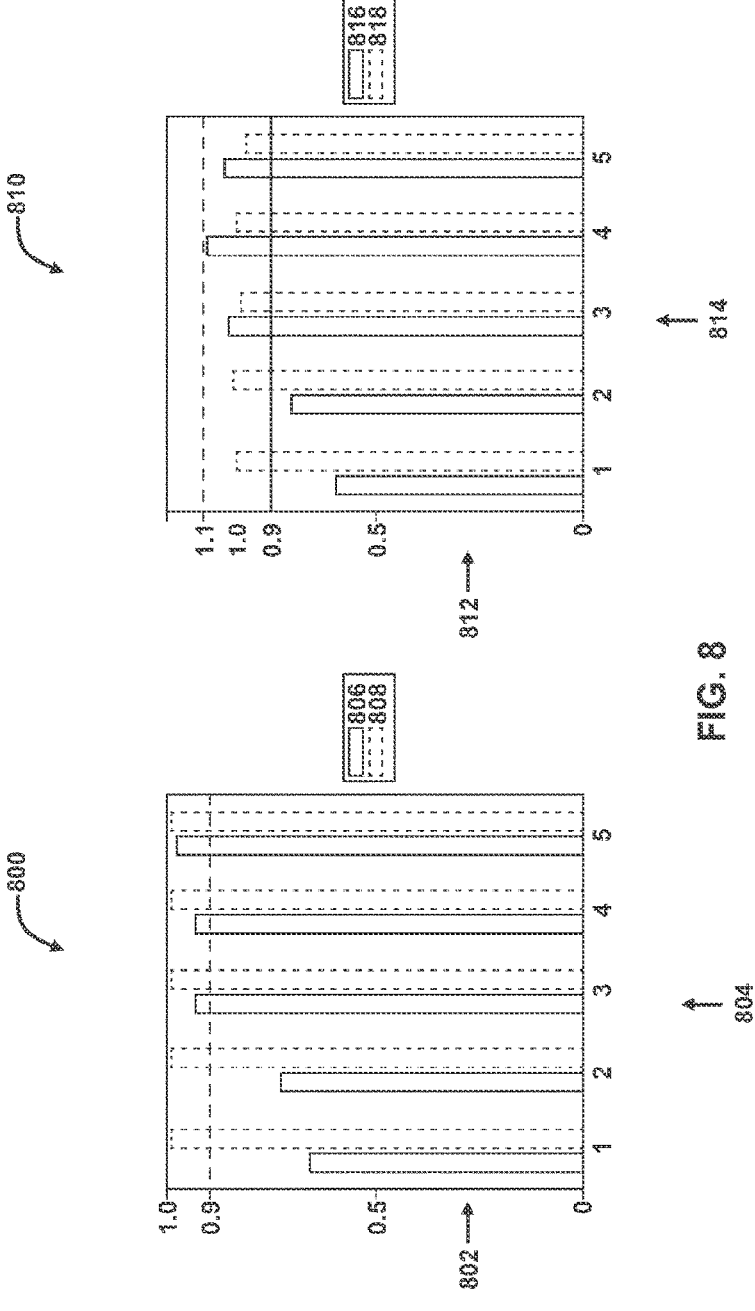
FIG. 8 illustrates how increasing a number of pattern types in a field of view when imaging a training substrate with a charged particle inspection system enhances patterning process parameter determination accuracy, consistent with embodiments of the present disclosure.

FIG. 8 illustrates how increasing the number of pattern types in a field of view when imaging a training substrate with a charged particle inspection system enhances (eventual) patterning process parameter determination (prediction) accuracy. FIG. 8 illustrates 800 how $R^2$ values 802 (e.g., indicating the goodness of fit between actual and predicted values) increase past a lower limit of 0.9 and approach 1.0 as the number of pattern types 804 increase (to three or more) for both focus 806 and dose 808 (note that dose 808 requires only one pattern type 804). FIG. 8 also illustrates 810 how the slope 812 for predicted versus actual patterning process parameter values is between a lower limit of 0.9 and an upper limit of 1.1 (and is very nearly 1.0) when then number of pattern types 814 is three or more for both focus 816 and dose 818 (again note that dose 818 requires only one pattern type 814). As shown in FIG. 8, when one or even two pattern types are used, the prediction goodness-of-fit (e.g., for focus 806, 816) may be lower than 0.9 and the slope is less close to 1.0. The more pattern types 804, 814, the better the patterning process parameter determination (prediction) accuracy.

Figure 9:
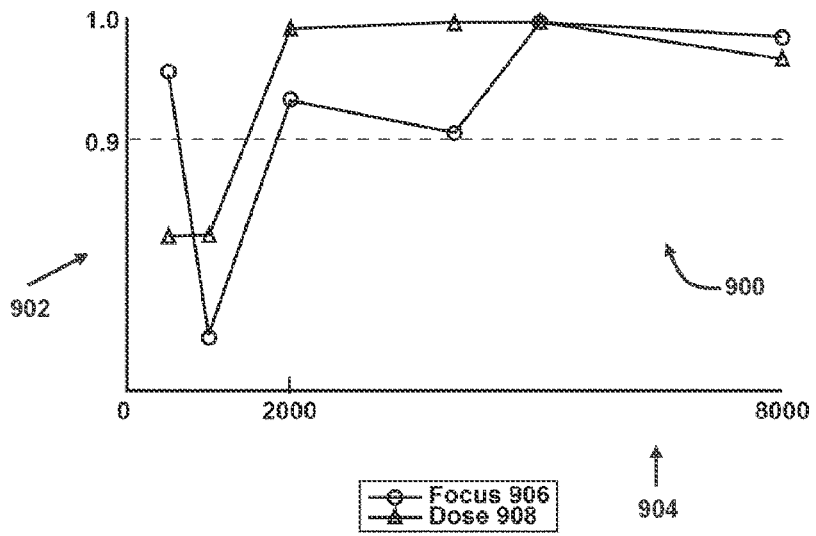
FIG. 9 illustrates how the size of the field of view of the charged particle inspection system impacts patterning process parameter determination (prediction) accuracy, consistent with embodiments of the present disclosure.

The number of pattern types in a field of view is related to the size of the field of view of a charged particle inspection system. The size of the field of view regulates the number of pattern types that fit within the field of view. FIG. 9 illustrates how the size (width) of the field of view of the charged particle inspection system impacts the (eventual) patterning process parameter determination (prediction) accuracy. FIG. 9 illustrates 900 how $R^2$ values 902 (e.g., indicating the goodness of fit between actual and predicted values) increase past a lower limit of 0.9 and approach 1.0 as the size (width) 904 of the field of view increases (e.g., past 2000 nm or two micrometers) for both focus 906 and dose 908. As shown in FIG. 9, when the field of view size (width) 904 is smaller than two micrometers, the $R^2$ value is lower than 0.9. The larger the field of view, the more accurate the prediction.

Figure 10:
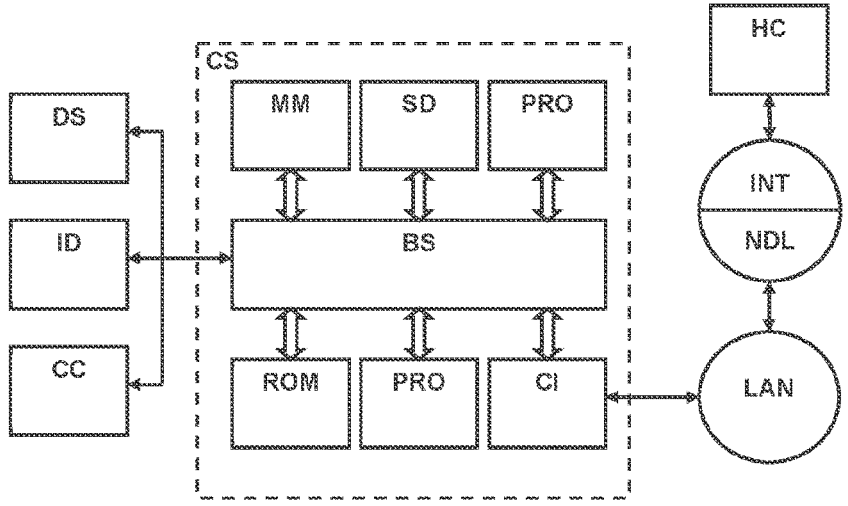
FIG. 10 is a block diagram of an example computer system, consistent with embodiments of the present disclosure.

FIG. 10 is a diagram of an example computer system CS (which may be similar to or the same as CL shown in FIG. 3) that may be used for one or more of the operations described herein. Computer system CS includes a bus BS or other communication mechanism for communicating information, and a processor PRO (or multiple processors) coupled with bus BS for processing information. Computer system CS also includes a main memory MM, such as a random access memory (RAM) or other dynamic storage device, coupled to bus BS for storing information and instructions to be executed by processor PRO. Main memory MM also may be used for storing temporary variables or other intermediate information during execution of instructions by processor PRO. Computer system CS further includes a read only memory (ROM) ROM or other static storage device coupled to bus BS for storing static information and instructions for processor PRO. A storage device SD, such as a magnetic disk or optical disk, is provided and coupled to bus BS for storing information and instructions.

Computer system CS may be coupled via bus BS to a display DS, such as a cathode ray tube (CRT) or flat panel or touch panel display for displaying information to a computer user. An input device ID, including alphanumeric and other keys, is coupled to bus BS for communicating information and command selections to processor PRO. Another type of user input device is cursor control CC, such as a mouse, a trackball, or cursor direction keys for communicating direction information and command selections to processor PRO and for controlling cursor movement on display DS. This input device typically has two degrees of freedom in two axes, a first axis (e.g., x) and a second axis (e.g., y), that allows the device to specify positions in a plane. A touch panel (screen) display may also be used as an input device.

In some embodiments, portions of one or more methods described herein may be performed by computer system CS in response to processor PRO executing one or more sequences of one or more instructions contained in main memory MM. Such instructions may be read into main memory MM from another computer-readable medium, such as storage device SD. Execution of the sequences of instructions included in main memory MM causes processor PRO to perform the process steps (operations) described herein. One or more processors in a multi-processing arrangement may also be employed to execute the sequences of instructions contained in main memory MM. In some embodiments, hard-wired circuitry may be used in place of or in combination with software instructions. Thus, the description herein is not limited to any specific combination of hardware circuitry and software.

The term "computer-readable medium" as used herein refers to any medium that participates in providing instructions to processor PRO for execution. Such a medium may take many forms, including but not limited to, non-volatile media, volatile media, and transmission media. Non-volatile media include, for example, optical or magnetic disks, such as storage device SD. Volatile media include dynamic memory, such as main memory MM. Transmission media include coaxial cables, copper wire and fiber optics, including the wires that comprise bus BS. Transmission media can also take the form of acoustic or light waves, such as those generated during radio frequency (RF) and infrared (IR) data communications. Computer-readable media can be non-transitory, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge. Non-transitory computer readable media can have (machine-readable) instructions recorded thereon. The instructions, when executed by a computer, can implement any of the operations described herein. Transitory computer-readable media can include a carrier wave or other propagating electromagnetic signal, for example.

Various forms of computer readable media may be involved in carrying one or more sequences of one or more machine-readable instructions to processor PRO for execution. For example, the instructions may initially be borne on a magnetic disk of a remote computer. The remote computer can load the instructions into its dynamic memory and send the instructions over a telephone line using a modem. A modem local to computer system CS can receive the data on the telephone line and use an infrared transmitter to convert the data to an infrared signal. An infrared detector coupled to bus BS can receive the data carried in the infrared signal and place the data on bus BS. Bus BS carries the data to main memory MM, from which processor PRO retrieves and executes the instructions. The instructions received by main memory MM may optionally be stored on storage device SD either before or after execution by processor PRO.

By way of an example, for an SEM (e.g., as described above), a computer readable medium may be provided that stores instructions for a processor (PRO) of a controller (e.g., CS) to carry out image inspection, image acquisition, activating a charged-particle source, adjusting electrical excitation of stigmators, adjusting landing energy of electrons, adjusting objective lens excitation, adjusting secondary electron detector position and orientation, stage motion control, beam separator excitation, applying scan deflection voltages to beam deflectors, receiving and processing data associated with signal information from electron detectors, configuring an electrostatic element, detecting signal electrons, adjusting the control electrode potential, adjusting the voltages applied to the electron source, extractor electrode, and the sample, etc.

Computer system CS may also include a communication interface CI coupled to bus BS. Communication interface CI provides a two-way data communication coupling to a network link NDL that is connected to a local network LAN. For example, communication interface CI may be an integrated services digital network (ISDN) card or a modem to provide a data communication connection to a corresponding type of telephone line. As another example, communication interface CI may be a local area network (LAN) card to provide a data communication connection to a compatible LAN. Wireless links may also be implemented. In any such implementation, communication interface CI sends and receives electrical, electromagnetic, or optical signals that carry digital data streams representing various types of information.

Network link NDL typically provides data communication through one or more networks to other data devices. For example, network link NDL may provide a connection through local network LAN to a host computer HC. This can include data communication services provided through the worldwide packet data communication network, now commonly referred to as the "Internet" INT. Local network LAN (Internet) may use electrical, electromagnetic, or optical signals that carry digital data streams. The signals through the various networks and the signals on network data link NDL and through communication interface CI, which carry the digital data to and from computer system CS, are exemplary forms of carrier waves transporting the information.

Computer system CS can send messages and receive data, including program code, through the network(s), network data link NDL, and communication interface CI. In the Internet example, host computer HC might transmit a requested code for an application program through Internet INT, network data link NDL, local network LAN, and communication interface CI. One such downloaded application may provide all or part of a method described herein, for example. The received code may be executed by processor PRO as it is received, or stored in storage device SD, or other non-volatile storage for later execution. In this manner, computer system CS may obtain application code in the form of a carrier wave.

Figure 11:
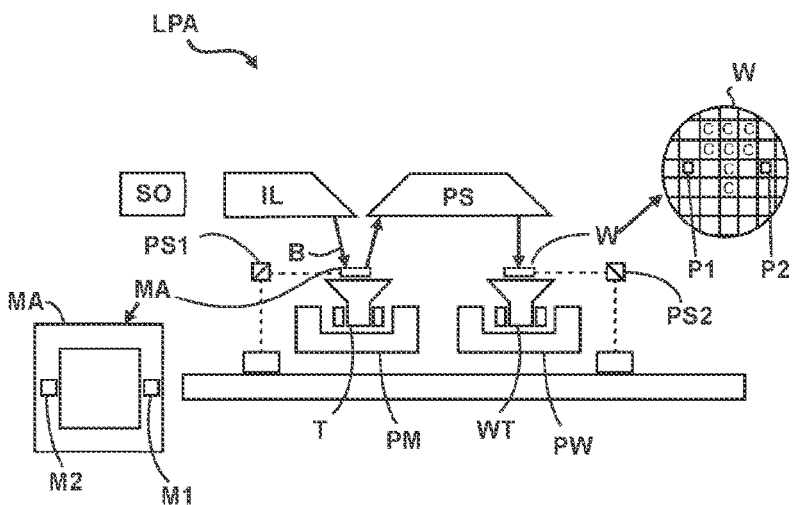
FIG. 11 is schematic diagram of another lithographic projection apparatus, consistent with embodiments of the present disclosure.

FIG. 11 is a schematic diagram of another lithographic projection apparatus (LPA) that may be used for, or facilitate one or more of the operations described herein. The LPA shown in FIG. 11 is similar to or the same as the apparatus shown in FIG. 1. LPA can include source collector module SO, illumination system (illuminator) IL configured to condition a radiation beam B (e.g. EUV radiation), patterning device table T, substrate table WT, and projection system PS. Patterning device table T can be constructed to support a patterning device (e.g. a mask or a reticle) MA and connected to a first positioner PM configured to accurately position the patterning device. Substrate table (e.g. a wafer table) WT can be constructed to hold a substrate (e.g. a resist coated wafer) W and connected to a second positioner PW configured to accurately position the substrate. Projection system (e.g. a reflective projection system) PS can be configured to project a pattern imparted to the radiation beam B by patterning device MA onto a target portion C (e.g. comprising one or more dies) of the substrate W.

As shown in this example, LPA can be of a reflective type (e.g. employing a reflective patterning device). It is to be noted that because most materials are absorptive within the EUV wavelength range, the patterning device may have multilayer reflectors comprising, for example, a multi-stack of molybdenum and silicon. In one example, the multi-stack reflector has a 40 layer pairs of molybdenum and silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Illuminator IL can receive an extreme ultra violet radiation beam from source collector module SO. Methods to produce EUV radiation include, but are not necessarily limited to, converting a material into a plasma state that has at least one element, e.g., xenon, lithium, or tin, with one or more emission lines in the EUV range. In one such method, often termed laser produced plasma ("LPP"), the plasma can be produced by irradiating a fuel, such as a droplet, stream or cluster of material having the line-emitting element, with a laser beam. Source collector module SO may be part of an EUV radiation system including a laser (not shown in FIG. 11), for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation. In this example, the laser may not be considered to form part of the lithographic apparatus and the radiation beam can be passed from the laser to the source collector module with the aid of a beam delivery system comprising, for example, suitable directing mirrors or a beam expander. In other examples, the source may be an integral part of the source collector module, for example when the source is a discharge produced plasma EUV generator, often termed a DPP source.

Illuminator IL may comprise an adjuster for adjusting the angular intensity distribution of the radiation beam. Generally, at least the outer or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B can be incident on the patterning device (e.g., mask) MA, which is held by patterning device table T, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder, or capacitive sensor), the substrate table WT can be moved accurately (e.g. to position different target portions C in the path of radiation beam B). Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus LPA could be used in at least one of the following modes, step mode, scan mode, and stationary mode. In step mode, the patterning device table T and the substrate table WT are kept essentially stationary, while an entire pattern imparted to the radiation beam is projected onto a target portion C at one time (e.g., a single static exposure). The substrate table WT is then shifted in the X or Y direction so that a different target portion C can be exposed. In scan mode, the patterning device table T and the substrate table WT are scanned synchronously while a pattern imparted to the radiation beam is projected onto target portion C (i.e. a single dynamic exposure). The velocity and direction of substrate table WT relative to the patterning device table T may be determined by the (de) magnification and image reversal characteristics of the projection system PS. In stationary mode, the patterning device table T is kept essentially stationary holding a programmable patterning device, and substrate table WT is moved or scanned while a pattern imparted to the radiation beam is projected onto a target portion C. In this mode, generally a pulsed radiation source is employed, and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 12:
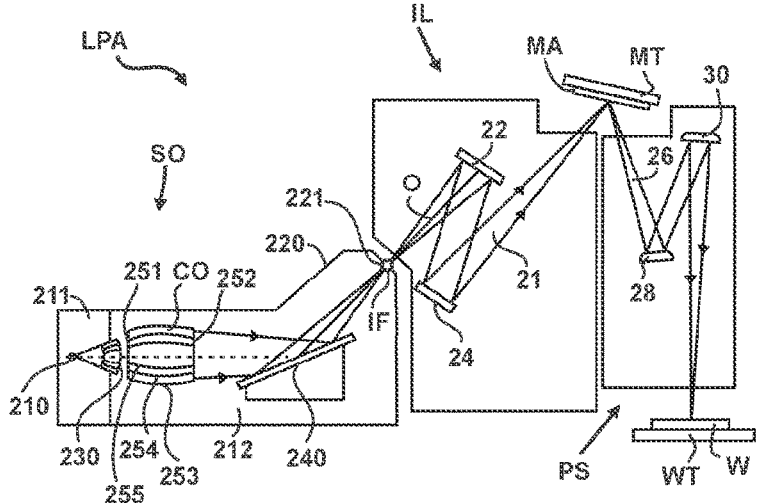
FIG. 12 is a more detailed view of components of a lithographic projection apparatus (e.g., the lithographic projection apparatus illustrated in FIG. 1 or FIG. 11), consistent with embodiments of the present disclosure.

FIG. 12 is a more detailed view of the lithographic projection apparatus shown in FIG. 11 (or FIG. 1). As shown in FIG. 12, the LPA can include the source collector module SO, the illumination system IL, and the projection system PS. The source collector module SO is configured such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the hot plasma 210 is created to emit radiation in the EUV range of the electromagnetic spectrum. The hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In some embodiments, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier trap 230 (described below) also includes a channel structure. The collector chamber 211 may include a radiation collector CO which may be a grazing incidence collector. Radiation collector CO has an upstream radiation collector side 251 and a downstream radiation collector side 252. Radiation that traverses collector CO can be reflected off a grating spectral filter 240 to be focused on a virtual source point IF along the optical axis indicated by the line "O". The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently, the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the radiation beam 21 at the patterning device MA, held by the patterning device table T, a patterned beam 26 is formed and the patterned beam 26 is imaged by the projection system PS via reflective elements 28, 30 onto a substrate W held by the substrate table WT. More elements than shown may generally be present in illumination optics unit IL and projection system PS. The grating spectral filter 240 may optionally be present, depending upon the type of lithographic apparatus, for example. Further, there may be more mirrors present than those shown in the figures, for example there may be 1-6 additional reflective elements present in the projection system PS than shown in FIG. 12.

Collector optic CO, as illustrated in FIG. 12, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Various embodiments are disclosed in the subsequent list of numbered clauses:

1. A method for determining one or more patterning parameters used by a patterning system, using a charged particle inspection system, the method comprising: inspecting a patterned substrate with the charged particle inspection system to determine one or more dimensions of the patterned substrate, wherein the patterned substrate is produced using the patterning system and the one or more patterning parameters; and determining the one or more patterning parameters based on a relationship between the one or more patterning parameters and one or more determined dimensions of the patterned substrate, wherein: the relationship is determined based on training dimensions from a training substrate patterned with one or more training parameters varied across a patterning process window and inspected using the charged particle inspection system, the charged particle inspection system having a field of view configured to include a minimum threshold number of pattern types on the training substrate in the field of view, the training dimensions determined based on the minimum threshold number of pattern types in the field of view.

2. The method of clause 1, wherein the one or more patterning parameters comprise focus and dose.

3. The method of any of the previous clauses, wherein the one or more patterning parameters and the patterning system are associated with an extreme ultra violet (EUV) patterning process. (1)

4. The method of any of the previous clauses, wherein the one or more determined dimensions comprise critical dimension (CD), critical dimension uniformity (CDU), edge placement error (EPE), or local placement error (LPE). (1)

5. The method of any of the previous clauses, wherein the field of view is at least two micrometers wide. (1)

6. The method of any of the previous clauses, wherein a pattern type comprises one of more features of the patterned substrate that respond differently to variation of the training parameters across the patterning process window. (1)

7. The method of any of the previous clauses, wherein the minimum threshold number of pattern types comprises three pattern types. (1)

8. The method of any of the previous clauses, further comprising determining an offset between a determined patterning parameter and a corresponding set point of the patterning system. (1)

9. The method of any of the previous clauses, further comprising adjusting the patterning system based on the offset. (8)

10. The method of any of the previous clauses, wherein the relationship is determined using multivariable regression. (1)

11. The method of any of the previous clauses, wherein the multivariable regression comprises linear regression, polynomial regression, or machine learning based non-linear regression. (10)

12. The method of any of the previous clauses, wherein the relationship is determined by a machine learning based prediction model trained using the training dimensions and the training parameters. (1)

13. The method of any of the previous clauses, wherein the patterning system is a scanner used in a semiconductor lithography process. (1)

14. The method of any of the previous clauses, wherein the process window comprises variations of the one or more patterning parameters associated with a regular production patterning process. (1)

15. The method of any of the previous clauses, wherein the charged particle inspection system is a scanning electron microscope (SEM), and the patterned substrate is a patterned semiconductor wafer. (1)

16. A system for determining one or more patterning parameters used by a patterning system, using a charged particle inspection system, the system comprising: a charged particle inspection system configured to inspect a patterned substrate to determine one or more dimensions of the patterned substrate, wherein the patterned substrate is produced using the patterning system and the one or more patterning parameters; and one or more processors configured by machine readable instructions to: determine the one or more patterning parameters based on a relationship between the one or more patterning parameters and one or more determined dimensions of the patterned substrate, wherein: the relationship is determined based on training dimensions from a training substrate patterned with one or more training parameters varied across a patterning process window and inspected using the charged particle inspection system, the charged particle inspection system having a field of view configured to include a minimum threshold number of pattern types on the training substrate in the field of view, the training dimensions determined based on the minimum threshold number of pattern types in the field of view.

17. The system of clause 16, wherein the one or more patterning parameters comprise focus and dose.

18. The system of any of the previous clauses, wherein the one or more patterning parameters and the patterning system are associated with an extreme ultra violet (EUV) patterning process. (16)

19. The system of any of the previous clauses, wherein the one or more determined dimensions comprise critical dimension (CD), critical dimension uniformity (CDU), edge placement error (EPE), or local placement error (LPE). (16)

20. The system of any of the previous clauses, wherein the field of view is at least two micrometers wide. (16)

21. The system of any of the previous clauses, wherein a pattern type comprises one of more features of the patterned substrate that respond differently to variation of the training parameters across the patterning process window. (16)

22. The system of any of the previous clauses, wherein the minimum threshold number of pattern types comprises three pattern types. (16)

23. The system of any of the previous clauses, wherein the one or more processors are further configured to determine an offset between a determined patterning parameter and a corresponding set point of the patterning system. (16)

24. The system of any of the previous clauses, wherein the one or more processors are further configured to adjust the patterning system based on the offset. (23)

25. The system of any of the previous clauses, wherein the relationship is determined using multivariable regression. (16)

26. The system of any of the previous clauses, wherein the multivariable regression comprises linear regression, polynomial regression, or machine learning based non-linear regression. (25)

27. The system of any of the previous clauses, wherein the one or more processors are configured such that the relationship is determined by a machine learning based prediction model trained using the training dimensions and the training parameters. (16)

28. The system of any of the previous clauses, wherein the patterning system is a scanner used in a semiconductor lithography process. (16)

29. The system of any of the previous clauses, wherein the process window comprises variations of the one or more patterning parameters associated with a regular production patterning process. (16)

30. The system of any of the previous clauses, wherein the charged particle inspection system is a scanning electron microscope (SEM), and the patterned substrate is a patterned semiconductor wafer. (16)

31. A non-transitory computer readable medium having instructions thereon, the instructions when executed by a computer, causing operations comprising: inspecting a patterned substrate with a charged particle inspection system to determine one or more dimensions of the patterned substrate, wherein the patterned substrate is produced using a patterning system and one or more patterning parameters; and determining the one or more patterning parameters based on a relationship between the one or more patterning parameters and one or more determined dimensions of the patterned substrate, wherein: the relationship is determined based on training dimensions from a training substrate patterned with one or more training parameters varied across a patterning process window and inspected using the charged particle inspection system, the charged particle inspection system having a field of view configured to include a minimum threshold number of pattern types on the training substrate in the field of view, the training dimensions determined based on the minimum threshold number of pattern types in the field of view.

32. The medium of clause 31, wherein the one or more patterning parameters comprise focus and dose. (31)

33. The medium of any of the previous clauses, wherein the one or more patterning parameters and the patterning system are associated with an extreme ultra violet (EUV) patterning process. (31)

34. The medium of any of the previous clauses, wherein the one or more determined dimensions comprise critical dimension (CD), critical dimension uniformity (CDU), edge placement error (EPE), or local placement error (LPE). (31)

35. The medium of any of the previous clauses, wherein the field of view is at least two micrometers wide. (31)

36. The medium of any of the previous clauses, wherein a pattern type comprises one of more features of the patterned substrate that respond differently to variation of the training parameters across the patterning process window. (31)

37. The medium of any of the previous clauses, wherein the minimum threshold number of pattern types comprises three pattern types. (31)

38. The medium of any of the previous clauses, the operations further comprising determining an offset between a determined patterning parameter and a corresponding set point of the patterning system. (31)

39. The medium of any of the previous clauses, the operations further comprising adjusting the patterning system based on the offset. (38)

40. The medium of any of the previous clauses, wherein the relationship is determined using multivariable regression. (31)

41. The medium of any of the previous clauses, wherein the multivariable regression comprises linear regression, polynomial regression, or machine learning based non-linear regression. (40)

42. The medium of any of the previous clauses, wherein the relationship is determined by a machine learning based prediction model trained using the training dimensions and the training parameters. (31)

43. The medium of any of the previous clauses, wherein the patterning system is a scanner used in a semiconductor lithography process. (31)

44. The medium of any of the previous clauses, wherein the process window comprises variations of the one or more patterning parameters associated with a regular production patterning process. (31)

45. The medium of any of the previous clauses, wherein the charged particle inspection system is a scanning electron microscope (SEM), and the patterned substrate is a patterned semiconductor wafer. (31)

46. A method for determining one or more patterning parameters used by a patterning system, using a charged particle inspection system, the method comprising: patterning, using the patterning system, a training substrate with one or more training parameters varied across a process window; determining, using the charged particle inspection system, training dimensions from the training substrate, determining a relationship between the training parameters and the training dimensions, wherein the relationship is determined (1) using multivariable regression or (2) by a machine learning based prediction model trained using the training dimensions and the training parameters; inspecting a patterned substrate with the charged particle inspection system to determine one or more dimensions of the patterned substrate, wherein the patterned substrate is produced using the patterning system and the one or more patterning parameters; and determining the one or more patterning parameters based on the relationship and one or more determined dimensions of the patterned substrate.

47. The method of any of the previous clauses, wherein the one or more patterning parameters comprise focus and dose. (46)

48. The method of any of the previous clauses, wherein the one or more patterning parameters and the patterning system are associated with an extreme ultra violet (EUV) patterning process. (46)

49. The method of any of the previous clauses, wherein the one or more determined dimensions comprise critical dimension (CD), critical dimension uniformity (CDU), edge placement error (EPE), or local placement error (LPE). (46)

50. The method of any of the previous clauses, wherein the charged particle inspection system has a field of view configured to include a minimum threshold number of pattern types on the training substrate in the field of view, the training dimensions determined based on the minimum threshold number of pattern types in the field of view. (46)

51. The method of any of the previous clauses, wherein the field of view is at least two micrometers wide. (50)

52. The method of any of the previous clauses, wherein a pattern type comprises one of more features of the patterned substrate that respond differently to variation of the training parameters across the process window. (50)

53. The method of any of the previous clauses, wherein the minimum threshold number of pattern types comprises three pattern types. (50)

54. The method of any of the previous clauses, further comprising determining an offset between a determined patterning parameter and a corresponding set point of the patterning system. (46)

55. The method of any of the previous clauses, further comprising adjusting the patterning system based on the offset. (54)

56. The method of any of the previous clauses, wherein the relationship is determined using multivariable regression, and wherein the multivariable regression comprises linear regression, polynomial regression, or machine learning based non-linear regression. (46)

57. The method of any of the previous clauses, wherein the machine learning based prediction model is trained by providing corresponding pairs of training dimensions and training parameters to the machine learning based prediction model as input. (46)

58. The method of any of the previous clauses, wherein the patterning system is a scanner used in a semiconductor lithography process. (46)

59. The method of any of the previous clauses, wherein the process window comprises variations of the one or more patterning parameters associated with a regular production patterning process. (46)

60. The method of any of the previous clauses, wherein the charged particle inspection system is a scanning electron microscope (SEM), and the patterned substrate is a patterned semiconductor wafer. (46)

61. A system for determining one or more patterning parameters, the system comprising: a patterning system configured to pattern a training substrate with one or more training parameters varied across a process window; a charged particle inspection system configured to determine training dimensions from the training substrate; and one or more processors configured by machine readable instructions to determine a relationship between the training parameters and the training dimensions, wherein the relationship is determined (1) using multivariable regression or (2) by a machine learning based prediction model trained using the training dimensions and the training parameters; wherein the charged particle inspection system is used to inspect a patterned substrate to determine one or more dimensions of the patterned substrate, wherein the patterned substrate is produced using the patterning system and the one or more patterning parameters; and wherein the one or more processors are configured to determine the one or more patterning parameters based on the relationship and one or more determined dimensions of the patterned substrate.

62. The system of any of the previous clauses, wherein the one or more patterning parameters comprise focus and dose. (61)

63. The system of any of the previous clauses, wherein the one or more patterning parameters and the patterning system are associated with an extreme ultra violet (EUV) patterning process. (61)

64. The system of any of the previous clauses, wherein the one or more determined dimensions comprise critical dimension (CD), critical dimension uniformity (CDU), edge placement error (EPE), or local placement error (LPE). (61)

65. The system of any of the previous clauses, wherein the charged particle inspection system has a field of view configured to include a minimum threshold number of pattern types on the training substrate in the field of view, the training dimensions determined based on the minimum threshold number of pattern types in the field of view. (61)

66. The system of any of the previous clauses, wherein the field of view is at least two micrometers wide. (65)

67. The system of any of the previous clauses, wherein a pattern type comprises one of more features of the patterned substrate that respond differently to variation of the training parameters across the process window. (65)

68. The system of any of the previous clauses, wherein the minimum threshold number of pattern types comprises three pattern types. (65)

69. The system of any of the previous clauses, wherein the one or more processors are further configured to determine an offset between a determined patterning parameter and a corresponding set point of the patterning system. (61)

70. The system of any of the previous clauses, wherein the one or more processors are further configured to adjust the patterning system based on the offset. (69)

71. The system of any of the previous clauses, wherein the relationship is determined using multivariable regression, and wherein the multivariable regression comprises linear regression, polynomial regression, or machine learning based non-linear regression. (61)

72. The system of any of the previous clauses, wherein the machine learning based prediction model is trained by providing corresponding pairs of training dimensions and training parameters to the machine learning based prediction model as input. (61)

73. The system of any of the previous clauses, wherein the patterning system is a scanner used in a semiconductor lithography process. (61)

74. The system of any of the previous clauses, wherein the process window comprises variations of the one or more patterning parameters associated with a regular production patterning process. (61)

75. The system of any of the previous clauses, wherein the charged particle inspection system is a scanning electron microscope (SEM), and the patterned substrate is a patterned semiconductor wafer. (61)

76. A non-transitory computer readable medium having instructions thereon, the instructions when executed by a computer, causing operations comprising: patterning, using a patterning system, a training substrate with one or more training parameters varied across a process window; determining, using a charged particle inspection system, training dimensions from the training substrate, determining a relationship between the training parameters and the training dimensions, wherein the relationship is determined (1) using multivariable regression or (2) by a machine learning based prediction model trained using the training dimensions and the training parameters; inspecting a patterned substrate with the charged particle inspection system to determine one or more dimensions of the patterned substrate, wherein the patterned substrate is produced using the patterning system and the one or more patterning parameters; and determining one or more patterning parameters based on the relationship and one or more determined dimensions of the patterned substrate.

77. The medium of any of the previous clauses, wherein the one or more patterning parameters comprise focus and dose. (76)

78. The medium of any of the previous clauses, wherein the one or more patterning parameters and the patterning system are associated with an extreme ultra violet (EUV) patterning process. (76)

79. The medium of any of the previous clauses, wherein the one or more determined dimensions comprise critical dimension (CD), critical dimension uniformity (CDU), edge placement error (EPE), or local placement error (LPE). (76)

80. The medium of any of the previous clauses, wherein the charged particle inspection system has a field of view configured to include a minimum threshold number of pattern types on the training substrate in the field of view, the training dimensions determined based on the minimum threshold number of pattern types in the field of view. (76)

81. The medium of any of the previous clauses, wherein the field of view is at least two micrometers wide. (80)

82. The medium of any of the previous clauses, wherein a pattern type comprises one of more features of the patterned substrate that respond differently to variation of the training parameters across the process window. (80)

83. The medium of any of the previous clauses, wherein the minimum threshold number of pattern types comprises three pattern types. (80)

84. The medium of any of the previous clauses, the operations further comprising determining an offset between a determined patterning parameter and a corresponding set point of the patterning system. (76)

85. The medium of any of the previous clauses, the operations further comprising adjusting the patterning system based on the offset. (84)

86. The medium of any of the previous clauses, wherein the relationship is determined using multivariable regression, and wherein the multivariable regression comprises linear regression, polynomial regression, or machine learning based non-linear regression. (76)

87. The medium of any of the previous clauses, wherein the machine learning based prediction model is trained by providing corresponding pairs of training dimensions and training parameters to the machine learning based prediction model as input. (76)

88. The medium of any of the previous clauses, wherein the patterning system is a scanner used in a semiconductor lithography process. (76)

89. The medium of any of the previous clauses, wherein the process window comprises variations of the one or more patterning parameters associated with a regular production patterning process. (76)

90. The medium of any of the previous clauses, wherein the charged particle inspection system is a scanning electron microscope (SEM), and the patterned substrate is a patterned semiconductor wafer. (76)

91. A method for determining one or more patterning parameters used by a patterning system, using a charged particle inspection system, the method comprising: inspecting a patterned substrate with the charged particle inspection system to determine one or more dimensions of the patterned substrate, wherein the patterned substrate is produced using the patterning system and the one or more patterning parameters; and determining the one or more patterning parameters based on a relationship between the one or more patterning parameters and one or more determined dimensions of the patterned substrate, wherein: the relationship is determined based on training dimensions from a training substrate patterned with one or more training parameters varied across a patterning process window and inspected using the charged particle inspection system, the charged particle inspection system having a field of view configured to include a minimum threshold number of pattern types on the training substrate in the field of view, the training dimensions determined based on the minimum threshold number of pattern types in the field of view.

92. The method of any of the previous clauses, wherein the one or more patterning parameters comprise focus and dose. (91)

93. The method of any of the previous clauses, wherein the one or more patterning parameters and the patterning system are associated with an extreme ultra violet (EUV) patterning process. (91)

94. The method of any of the previous clauses, wherein the one or more determined dimensions comprise critical dimension (CD), critical dimension uniformity (CDU), edge placement error (EPE), or local placement error (LPE). (91)

95. The method of any of the previous clauses, wherein the field of view is at least two micrometers wide. (91)

96. The method of any of the previous clauses, wherein a pattern type comprises one of more features of the patterned substrate that respond differently to variation of the training parameters across the patterning process window. (91)

97. The method of any of the previous clauses, wherein the minimum threshold number of pattern types comprises three pattern types. (91)

98. The method of any of the previous clauses, further comprising determining an offset between a determined patterning parameter and a corresponding set point of the patterning system. (91)

99. The method of any of the previous clauses, further comprising adjusting the patterning system based on the offset. (98)

100. The method of any of the previous clauses, wherein the relationship is determined using multivariable regression. (91)

101. The method of any of the previous clauses, wherein the multivariable regression comprises linear regression, polynomial regression, or machine learning based non-linear regression. (100)

102. The method of any of the previous clauses, wherein the relationship is determined by a machine learning based prediction model trained using the training dimensions and the training parameters. (91)

103. The method of any of the previous clauses, wherein the patterning system is a scanner used in a semiconductor lithography process. (91)

104. The method of any of the previous clauses, wherein the process window comprises variations of the one or more patterning parameters associated with a regular production patterning process. (91)

105. The method of any of the previous clauses, wherein the charged particle inspection system is a scanning electron microscope (SEM), and the patterned substrate is a patterned semiconductor wafer. (91)

106. A system for determining one or more patterning parameters used by a patterning system, using a charged particle inspection system, the system comprising: a charged particle inspection system configured to inspect a patterned substrate to determine one or more dimensions of the patterned substrate, wherein the patterned substrate is produced using the patterning system and the one or more patterning parameters; and one or more processors configured by machine readable instructions to: determine the one or more patterning parameters based on a relationship between the one or more patterning parameters and one or more determined dimensions of the patterned substrate, wherein the relationship is determined based on training dimensions from a training substrate patterned with one or more training parameters varied across a patterning process window and inspected using the charged particle inspection system, the charged particle inspection system having a field of view configured to include a minimum threshold number of pattern types on the training substrate in the field of view, the training dimensions determined based on the minimum threshold number of pattern types in the field of view.

107. The system of any of the previous clauses, wherein the one or more patterning parameters comprise focus and dose. (106)

108. The system of any of the previous clauses, wherein the one or more patterning parameters and the patterning system are associated with an extreme ultra violet (EUV) patterning process. (106)

109. The system of any of the previous clauses, wherein the one or more determined dimensions comprise critical dimension (CD), critical dimension uniformity (CDU), edge placement error (EPE), or local placement error (LPE). (106)

110. The system of any of the previous clauses, wherein the field of view is at least two micrometers wide. (106)

111. The system of any of the previous clauses, wherein a pattern type comprises one of more features of the patterned substrate that respond differently to variation of the training parameters across the patterning process window. (106)

112. The system of any of the previous clauses, wherein the minimum threshold number of pattern types comprises three pattern types. (106)

113. The system of any of the previous clauses, wherein the one or more processors are further configured to determine an offset between a determined patterning parameter and a corresponding set point of the patterning system. (106)

114. The system of any of the previous clauses, wherein the one or more processors are further configured to adjust the patterning system based on the offset. (113)

115. The system of any of the previous clauses, wherein the relationship is determined using multivariable regression. (106)

116. The system of any of the previous clauses, wherein the multivariable regression comprises linear regression, polynomial regression, or machine learning based non-linear regression. (115)

117. The system of any of the previous clauses, wherein the one or more processors are configured such that the relationship is determined by a machine learning based prediction model trained using the training dimensions and the training parameters. (106)

118. The system of any of the previous clauses, wherein the patterning system is a scanner used in a semiconductor lithography process. (106)

119. The system of any of the previous clauses, wherein the process window comprises variations of the one or more patterning parameters associated with a regular production patterning process. (106)

120. The system of any of the previous clauses, wherein the charged particle inspection system is a scanning electron microscope (SEM), and the patterned substrate is a patterned semiconductor wafer. (106)

121. A non-transitory computer readable medium having instructions thereon, the instructions when executed by a computer, causing operations comprising: inspecting a patterned substrate with a charged particle inspection system to determine one or more dimensions of the patterned substrate, wherein the patterned substrate is produced using a patterning system and one or more patterning parameters; and determining the one or more patterning parameters based on a relationship between the one or more patterning parameters and one or more determined dimensions of the patterned substrate, wherein: the relationship is determined based on training dimensions from a training substrate patterned with one or more training parameters varied across a patterning process window and inspected using the charged particle inspection system, the charged particle inspection system having a field of view configured to include a minimum threshold number of pattern types on the training substrate in the field of view, the training dimensions determined based on the minimum threshold number of pattern types in the field of view.

122. The medium of any of the previous clauses, wherein the one or more patterning parameters comprise focus and dose. (121)

123. The medium of any of the previous clauses, wherein the one or more patterning parameters and the patterning system are associated with an extreme ultra violet (EUV) patterning process. (121)

124. The medium of any of the previous clauses, wherein the one or more determined dimensions comprise critical dimension (CD), critical dimension uniformity (CDU), edge placement error (EPE), or local placement error (LPE). (121)

125. The medium of any of the previous clauses, wherein the field of view is at least two micrometers wide. (121)

126. The medium of any of the previous clauses, wherein a pattern type comprises one of more features of the patterned substrate that respond differently to variation of the training parameters across the patterning process window. (121)

127. The medium of any of the previous clauses, wherein the minimum threshold number of pattern types comprises three pattern types. (121)

128. The medium of any of the previous clauses, the operations further comprising determining an offset between a determined patterning parameter and a corresponding set point of the patterning system. (121)

129. The medium of any of the previous clauses, the operations further comprising adjusting the patterning system based on the offset. (128)

130. The medium of any of the previous clauses, wherein the relationship is determined using multivariable regression. (121)

131. The medium of any of the previous clauses, wherein the multivariable regression comprises linear regression, polynomial regression, or machine learning based non-linear regression. (130)

132. The medium of any of the previous clauses, wherein the relationship is determined by a machine learning based prediction model trained using the training dimensions and the training parameters. (121)

133. The medium of any of the previous clauses, wherein the patterning system is a scanner used in a semiconductor lithography process. (121)

134. The medium of any of the previous clauses, wherein the process window comprises variations of the one or more patterning parameters associated with a regular production patterning process. (121)

135. The medium of any of the previous clauses, wherein the charged particle inspection system is a scanning electron microscope (SEM), and the patterned substrate is a patterned semiconductor wafer. (121)

136. A method for determining one or more semiconductor lithography parameters used by a scanner, using a scanning electron microscope (SEM), the method comprising: inspecting a patterned semiconductor wafer with the SEM to determine one or more dimensions of the patterned semiconductor wafer, wherein the patterned semiconductor wafer is produced using the scanner and the one or more semiconductor lithography parameters; determining the one or more semiconductor lithography parameters based on a relationship between the one or more semiconductor lithography parameters and one or more determined dimensions of the patterned semiconductor wafer, wherein: the relationship is determined based on training dimensions from a training wafer patterned with one or more training parameters varied across a process window and inspected using the SEM, the SEM having a field of view configured to include a minimum threshold number of pattern types on the training wafer in the field of view, the training dimensions determined based on the minimum threshold number of pattern types in the field of view; determining an offset between a determined semiconductor lithography parameter and a corresponding set point of the scanner; and adjusting the scanner based on the offset.

137. The method of any of the previous clauses, wherein the one or more patterning parameters comprise focus and dose, and the scanner is associated with an extreme ultra violet (EUV) patterning process. (136)

138. The method of any of the previous clauses, wherein a pattern type comprises one of more features of the patterned wafer that respond differently to variation of focus and dose across the process window; and wherein the field of view is at least two micrometers wide, and the minimum threshold number of pattern types comprises three pattern types. (137)

139. The method of any of the previous clauses, wherein the one or more determined dimensions comprise critical dimension (CD), critical dimension uniformity (CDU), edge placement error (EPE), or local placement error (LPE). (136)

140. The method of any of the previous clauses, wherein the relationship is determined using multivariable regression including linear regression, polynomial regression, or machine learning based non-linear regression; or wherein the relationship is determined by a machine learning based prediction model trained using the training dimensions and the one or more training parameters. (136)

141. A system for determining one or more semiconductor lithography parameters used by a scanner, the system comprising: a scanning electron microscope (SEM) configured to inspect a patterned semiconductor wafer to determine one or more dimensions of a patterned semiconductor wafer, wherein the patterned semiconductor wafer is produced using the scanner and the one or more semiconductor lithography parameters; and one or more processors configured by machine readable instructions to: determine the one or more semiconductor lithography parameters based on a relationship between the one or more semiconductor lithography parameters and one or more determined dimensions of the patterned semiconductor wafer, wherein: the relationship is determined by the one or more processors based on training dimensions from a training wafer patterned with one or more training parameters varied across a process window and inspected using a the SEM, the SEM having a field of view configured to include a minimum threshold number of pattern types on the training wafer in the field of view, the training dimensions determined based on the minimum threshold number of pattern types in the field of view; determine an offset between a determined semiconductor lithography parameter and a corresponding set point of the scanner; and adjust the scanner based on the offset.

142. The system of any of the previous clauses, wherein the one or more patterning parameters comprise focus and dose, and the patterning system is associated with an extreme ultra violet (EUV) patterning process.

143. The system of any of the previous clauses, wherein a pattern type comprises one of more features of the patterned wafer that respond differently to variation of focus and dose across the process window; and wherein the field of view is at least two micrometers wide, and the minimum threshold number of pattern types comprises three pattern types. (142)

144. The system of any of the previous clauses, wherein the one or more determined dimensions comprise critical dimension (CD), critical dimension uniformity (CDU), edge placement error (EPE), or local placement error (LPE). (141)

145. The system of any of the previous clauses, wherein the relationship is determined using multivariable regression including linear regression, polynomial regression, or machine learning based non-linear regression; or wherein the relationship is determined by a machine learning based prediction model trained using the training dimensions and the training parameters. (141)

146. A non-transitory computer readable medium having instructions thereon, the instructions when executed by a computer, causing operations comprising: inspecting a patterned semiconductor wafer with a scanning electron microscope (SEM) to determine one or more dimensions of the patterned semiconductor wafer, wherein the patterned semiconductor wafer is produced using a scanner and one or more semiconductor lithography parameters; determining the one or more semiconductor lithography parameters based on a relationship between the one or more semiconductor lithography parameters and one or more determined dimensions of the patterned semiconductor wafer, wherein: the relationship is determined based on training dimensions from a training wafer patterned with one or more training parameters varied across a process window and inspected using the SEM, the SEM having a field of view configured to include a minimum threshold number of pattern types on the training wafer in the field of view, the training dimensions determined based on the minimum threshold number of pattern types in the field of view; determining an offset between a determined semiconductor lithography parameter and a corresponding set point of the scanner; and adjusting the scanner based on the offset.

147. The medium of any of the previous clauses, wherein the one or more patterning parameters comprise focus and dose, and the scanner is associated with an extreme ultra violet (EUV) patterning process. (146)

148. The medium of any of the previous clauses, wherein a pattern type comprises one of more features of the patterned wafer that respond differently to variation of focus and dose across the process window; and wherein the field of view is at least two micrometers wide, and the minimum threshold number of pattern types comprises three pattern types. (147)

149. The medium of any of the previous clauses, wherein the one or more determined dimensions comprise critical dimension (CD), critical dimension uniformity (CDU), edge placement error (EPE), or local placement error (LPE). (146)

150. The medium of any of the previous clauses, wherein the relationship is determined using multivariable regression including linear regression, polynomial regression, or machine learning based non-linear regression; or wherein the relationship is determined by a machine learning based prediction model trained using the training dimensions and the one or more training parameters. (146)

151. A method for determining one or more patterning parameters used by a patterning system, using a charged particle inspection system, the method comprising: determining a relationship between training parameters and training dimensions, wherein: a training substrate is patterned with one or more training parameters varied across a process window; training dimensions are determined from the training substrate, using the charged particle inspection system; and the relationship is determined (1) using multivariable regression or (2) by a machine learning based prediction model trained using the training dimensions and the training parameters; inspecting a production substrate with the charged particle inspection system to determine one or more dimensions of the production substrate, wherein the production substrate is produced using the patterning system and the one or more patterning parameters; and applying the relationship to determine the one or more patterning parameters based on the one or more determined dimensions of the patterned substrate.

152. The method of any of the previous clauses, wherein the one or more patterning parameters comprise focus and dose. (151)

153. The method of any of the previous clauses, wherein the one or more patterning parameters and the patterning system are associated with an extreme ultra violet (EUV) patterning process. (151)

154. The method of any of the previous clauses, wherein the one or more determined dimensions comprise critical dimension (CD), critical dimension uniformity (CDU), edge placement error (EPE), or local placement error (LPE). (151)

155. The method of any of the previous clauses, wherein the charged particle inspection system has a field of view configured to include a minimum threshold number of pattern types on the training substrate in the field of view, the training dimensions determined based on the minimum threshold number of pattern types in the field of view. (151)

156. The method of any of the previous clauses, wherein the field of view is at least two micrometers wide. (155)

157. The method of any of the previous clauses, wherein a pattern type comprises one of more features of the patterned substrate that respond differently to variation of the training parameters across the process window. (155)

158. The method of any of the previous clauses, wherein the minimum threshold number of pattern types comprises three pattern types. (155)

159. The method of any of the previous clauses, further comprising determining an offset between a determined patterning parameter and a corresponding set point of the patterning system. (151)

160. The method of any of the previous clauses, further comprising adjusting the patterning system based on the offset. (159)

161. The method of any of the previous clauses, wherein the relationship is determined using multivariable regression, and wherein the multivariable regression comprises linear regression, polynomial regression, or machine learning based non-linear regression. (151)

162. The method of any of the previous clauses, wherein the machine learning based prediction model is trained by providing corresponding pairs of training dimensions and training parameters to the machine learning based prediction model as input. (151)

163. The method of any of the previous clauses, wherein the patterning system is a scanner used in a semiconductor lithography process. (151)

164. The method of any of the previous clauses, wherein the process window comprises variations of the one or more patterning parameters associated with a regular production patterning process. (151)

165. The method of any of the previous clauses, wherein the charged particle inspection system is a scanning electron microscope (SEM), and the patterned substrate is a patterned semiconductor wafer. (151)

166. The method of any of the previous clauses, wherein the dimensions comprise different polynomial orders. (151)

167. A system for determining one or more patterning parameters used by a patterning system, the system comprising: one or more processors configured to determine a relationship between training parameters and training dimensions, wherein: a training substrate is patterned with one or more training parameters varied across a process window; training dimensions are determined from the training substrate, using a charged particle inspection system; and the relationship is determined (1) using multivariable regression or (2) by a machine learning based prediction model trained using the training dimensions and the training parameters; and the charged particle inspection system, the charged particle inspection system configured to inspect a production substrate to determine one or more dimensions of the production substrate, wherein the production substrate is produced using the patterning system and the one or more patterning parameters; wherein the one or more processors are configured to apply the relationship to determine the one or more patterning parameters based on the one or more determined dimensions of the patterned substrate.

168. The system of any of the previous clauses, wherein the one or more patterning parameters comprise focus and dose. (167)

169. The system of any of the previous clauses, wherein the one or more patterning parameters and the patterning system are associated with an extreme ultra violet (EUV) patterning process. (167)

170. The system of any of the previous clauses, wherein the one or more determined dimensions comprise critical dimension (CD), critical dimension uniformity (CDU), edge placement error (EPE), or local placement error (LPE). (167)

171. The system of any of the previous clauses, wherein the charged particle inspection system has a field of view configured to include a minimum threshold number of pattern types on the training substrate in the field of view, the training dimensions determined based on the minimum threshold number of pattern types in the field of view. (167)

172. The system of clause 171, wherein the field of view is at least two micrometers wide. (171)

173. The system of any of the previous clauses, wherein a pattern type comprises one of more features of the patterned substrate that respond differently to variation of the training parameters across the process window. (171)

174. The system of any of the previous clauses, wherein the minimum threshold number of pattern types comprises three pattern types. (171)

175. The system of any of the previous clauses, wherein the one or more processors are further configured to determine an offset between a determined patterning parameter and a corresponding set point of the patterning system. (167)

176. The system of any of the previous clauses, wherein the one or more processors are further configured to adjust the patterning system based on the offset. (175)

177. The system of any of the previous clauses, wherein the relationship is determined using multivariable regression, and wherein the multivariable regression comprises linear regression, polynomial regression, or machine learning based non-linear regression. (167)

178. The system of any of the previous clauses, wherein the machine learning based prediction model is trained by providing corresponding pairs of training dimensions and training parameters to the machine learning based prediction model as input. (167)

179. The system of any of the previous clauses, wherein the patterning system is a scanner used in a semiconductor lithography process. (167)

180. The system of any of the previous clauses, wherein the process window comprises variations of the one or more patterning parameters associated with a regular production patterning process. (167)

181. The system of any of the previous clauses, wherein the charged particle inspection system is a scanning electron microscope (SEM), and the patterned substrate is a patterned semiconductor wafer. (167)

182. The system of the previous clauses, wherein the dimensions comprise different polynomial orders. (167)

183. A non-transitory computer readable medium having instructions thereon, the instructions when executed by a computer, causing operations comprising: determining a relationship between training parameters and training dimensions, wherein: a training substrate is patterned with one or more training parameters varied across a process window; training dimensions are determined from the training substrate, using a charged particle inspection system; and the relationship is determined (1) using multivariable regression or (2) by a machine learning based prediction model trained using the training dimensions and the training parameters; inspecting a production substrate with the charged particle inspection system to determine one or more dimensions of the production substrate, wherein the production substrate is produced using a patterning system and one or more patterning parameters; and applying the relationship to determine the one or more patterning parameters based on the one or more determined dimensions of the patterned substrate.

184. The medium of any of the previous clauses, wherein the one or more patterning parameters comprise focus and dose. (183)

185. The medium of any of the previous clauses, wherein the one or more patterning parameters and the patterning system are associated with an extreme ultra violet (EUV) patterning process. (183)

186. The medium of any of the previous clauses, wherein the one or more determined dimensions comprise critical dimension (CD), critical dimension uniformity (CDU), edge placement error (EPE), or local placement error (LPE). (183)

187. The medium of any of the previous clauses, wherein the charged particle inspection system has a field of view configured to include a minimum threshold number of pattern types on the training substrate in the field of view, the training dimensions determined based on the minimum threshold number of pattern types in the field of view. (183)

188. The medium of any of the previous clauses, wherein the field of view is at least two micrometers wide. (187)

189. The medium of any of the previous clauses, wherein a pattern type comprises one of more features of the patterned substrate that respond differently to variation of the training parameters across the process window. (187)

190. The medium of any of the previous clauses, wherein the minimum threshold number of pattern types comprises three pattern types. (187)

191. The medium of any of the previous clauses, the operations further comprising determining an offset between a determined patterning parameter and a corresponding set point of the patterning system. (183)

192. The medium of any of the previous clauses, the operations further comprising adjusting the patterning system based on the offset. (191)

193. The medium of any of the previous clauses, wherein the relationship is determined using multivariable regression, and wherein the multivariable regression comprises linear regression, polynomial regression, or machine learning based non-linear regression. (183)

194. The medium of any of the previous clauses, wherein the machine learning based prediction model is trained by providing corresponding pairs of training dimensions and training parameters to the machine learning based prediction model as input. (183)

195. The medium of any of the previous clauses, wherein the patterning system is a scanner used in a semiconductor lithography process. (183)

196. The medium of any of the previous clauses, wherein the process window comprises variations of the one or more patterning parameters associated with a regular production patterning process. (183)

197. The medium of any of the previous clauses, wherein the charged particle inspection system is a scanning electron microscope (SEM), and the patterned substrate is a patterned semiconductor wafer. (183)

198. The medium of any of the previous clauses, wherein the dimensions comprise different polynomial orders. (183)

The concepts disclosed herein may be used with any imaging, etching, polishing, inspection, etc. system for sub wavelength features, and may be useful with emerging imaging technologies capable of producing increasingly shorter wavelengths. Emerging technologies include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-50 nm by using a synchrotron or by hitting a material (either solid or a plasma) with high energy electrons in order to produce photons within this range.

While the concepts disclosed herein may be used for manufacturing with a substrate such as a silicon wafer, it shall be understood that the disclosed concepts may be used with any type of manufacturing system (e.g., those used for manufacturing on substrates other than silicon wafers).

In addition, the combination and sub-combinations of disclosed elements may comprise separate embodiments.

The descriptions above are intended to be illustrative, not limiting. Thus, it will be apparent to one skilled in the art that modifications may be made as described without departing from the scope of the claims set out below.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The invention claimed is:

1. A system for determining one or more patterning parameters used by a patterning system, using a charged particle inspection system, the system comprising:
   a charged particle inspection system configured to inspect a patterned substrate to determine one or more dimensions of the patterned substrate, wherein the patterned substrate is produced using the patterning system and the one or more patterning parameters; and
   one or more processors configured by machine readable instructions to:

determine the one or more patterning parameters based on a relationship between the one or more patterning parameters and one or more determined dimensions of the patterned substrate, wherein:
   the relationship is determined based on training dimensions from a training substrate patterned with one or more training parameters varied across a patterning process window and inspected using the charged particle inspection system, the charged particle inspection system having a field of view configured to include a minimum threshold number of pattern types on the training substrate in the field of view, the training dimensions determined based on the minimum threshold number of pattern types in the field of view.

2. The system of claim 1, wherein the one or more patterning parameters comprise focus and dose.

3. The system of claim 1, wherein the one or more patterning parameters and the patterning system are associated with an extreme ultra violet (EUV) patterning process.

4. The system of claim 1, wherein the one or more determined dimensions comprise critical dimension (CD), critical dimension uniformity (CDU), edge placement error (EPE), or local placement error (LPE).

5. The system of claim 1, wherein the field of view is at least two micrometers wide.

6. The system of claim 1, wherein a pattern type comprises one of more features of the patterned substrate that respond differently to variation of the training parameters across the patterning process window.

7. The system of claim 1, wherein the minimum threshold number of pattern types comprises three pattern types.

8. The system of claim 1, wherein the one or more processors are further configured to determine an offset between a determined patterning parameter and a corresponding set point of the patterning system.

9. The system of claim 8, wherein the one or more processors are further configured to adjust the patterning system based on the offset.

10. The system of claim 1, wherein the relationship is determined using multivariable regression.

11. The system of claim 10, wherein the multivariable regression comprises linear regression, polynomial regression, or machine learning based non-linear regression.

12. The system of claim 1, wherein the one or more processors are configured such that the relationship is determined by a machine learning based prediction model trained using the training dimensions and the training parameters.

13. The system of claim 1, wherein the patterning system is a scanner used in a semiconductor lithography process, the charged particle inspection system is a scanning electron microscope (SEM), and the patterned substrate is a patterned semiconductor wafer.

14. The system of claim 1, wherein the process window comprises variations of the one or more patterning parameters associated with a regular production patterning process.

15. A non-transitory computer readable medium having instructions thereon, the instructions when executed by a computer, causing operations comprising:
   inspecting a patterned substrate with a charged particle inspection system to determine one or more dimensions of the patterned substrate, wherein the patterned substrate is produced using a patterning system and one or more patterning parameters; and
   determining the one or more patterning parameters based on a relationship between the one or more patterning parameters and one or more determined dimensions of the patterned substrate, wherein:

the relationship is determined based on training dimensions from a training substrate patterned with one or more training parameters varied across a patterning process window and inspected using the charged particle inspection system, the charged particle inspection system having a field of view configured to include a minimum threshold number of pattern types on the training substrate in the field of view, the training dimensions determined based on the minimum threshold number of pattern types in the field of view.

16. The medium of claim 15, wherein the one or more patterning parameters comprise focus and dose.

17. The medium of claim 15, wherein the one or more patterning parameters and the patterning system are associated with an extreme ultra violet (EUV) patterning process.

18. The medium of claim 15, wherein the one or more determined dimensions comprise critical dimension (CD), critical dimension uniformity (CDU), edge placement error (EPE), or local placement error (LPE).

19. The medium of claim 15, wherein the field of view is at least two micrometers wide.

20. A method for determining one or more patterning parameters used by a patterning system, using a charged particle inspection system, the method comprising:

inspecting a patterned substrate with the charged particle inspection system to determine one or more dimensions of the patterned substrate, wherein the patterned substrate is produced using the patterning system and the one or more patterning parameters; and determining the one or more patterning parameters based on a relationship between the one or more patterning parameters and one or more determined dimensions of the patterned substrate, wherein:

the relationship is determined based on training dimensions from a training substrate patterned with one or more training parameters varied across a patterning process window and inspected using the charged particle inspection system, the charged particle inspection system having a field of view configured to include a minimum threshold number of pattern types on the training substrate in the field of view, the training dimensions determined based on the minimum threshold number of pattern types in the field of view.

\* \* \* \* \*